Dec. 29, 1959 H. S. BEATTIE ET AL 2,919,005

PRINTING APPARATUS

Original Filed Dec. 23, 1955 15 Sheets-Sheet 1

INVENTORS
HORACE S. BEATTIE
THEODORE L. BULEY
BERNARD M. MUENZER

BY Harry T. Berriman
AGENT

Dec. 29, 1959 H. S. BEATTIE ET AL 2,919,005

PRINTING APPARATUS

Original Filed Dec. 23, 1955 15 Sheets-Sheet 2

Dec. 29, 1959 H. S. BEATTIE ET AL 2,919,005

PRINTING APPARATUS

Original Filed Dec. 23, 1955 15 Sheets-Sheet 5

Dec. 29, 1959 H. S. BEATTIE ET AL 2,919,005

PRINTING APPARATUS

Original Filed Dec. 23, 1955 15 Sheets-Sheet 7

Dec. 29, 1959 H. S. BEATTIE ET AL 2,919,005

PRINTING APPARATUS

Original Filed Dec. 23, 1955 15 Sheets-Sheet 8

PRINTING APPARATUS

FIG. 13

| | 1 2 8 | 1 8 | 1 2 | 1 | 8 | 2 | BINARY CODE | | |
|---|---|---|---|---|---|---|---|---|---|
| | 3 2 1 H | 3 2 H | 3 1 H | 3H (820) | 2H (822) | 1H (825) | PRINT MAGNETS | | ↓ |
| 7 | | | G | E | ⌑ | F | D | 4-2-1R | $Z_1 Z_2$ 4 |
| 6 | • | I | C | A | H | B | ℰ | 4-2R | $Z_1$ $Z_2$ |
| 5 | | | P | N | * | O | M | 4-1R | $Z_2$ 4 |
| 4 | $ | R | L | J | Q | K | — | 4R (785) | Z |
| 3 | | | X | V | % | W | U | 2-1R | $Z_1$ 4 |
| 2 | , | Z | T | / | Y | S | 0 | 2R (788) | $Z_1$ |
| 1 | | | 7 | 5 | @ | 6 | 4 | 1R (791) | 4 |
| HOME POSITION 0 | # | 9 | 3 | 1 | 8 | 2 | | | |
| | 6 | 5 | 4 | 3 | 2 | 1 | 0 HOME POSITION | (BANDS) | |

FIG. 14

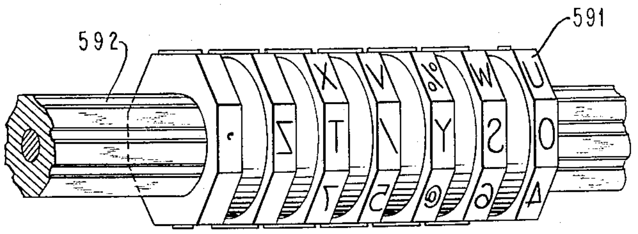

FIG. 15

| PRINT MAGNETS | TOTAL MOTION TYPE | TOTAL MOTION CYLINDER |
|---|---|---|
| $Z_1$ $Z_2$ 1 | 3H | 6R |
| $Z_1$ $Z_2$ 2 | 1H | 6R |
| $Z_1$ $Z_2$ 1 2 | 4H | 6R |
| $Z_1$ $Z_2$ 4 | 0H | 7R |
| $Z_1$ $Z_2$ 1 4 | 3H | 7R |
| $Z_1$ $Z_2$ 2 4 | 1H | 7R |
| $Z_1$ $Z_2$ 1 2 4 | 4H | 7R |
| $Z_1$ $Z_2$ 8 | 2H | 6R |
| $Z_1$ $Z_2$ 1 8 | 5H | 6R |
| $Z_2$ 1 | 3H | 4R |
| $Z_2$ 2 | 1H | 4R |
| $Z_2$ 1 2 | 4H | 4R |
| $Z_2$ 4 | 0H | 5R |
| $Z_2$ 1 4 | 3H | 5R |
| $Z_2$ 2 4 | 1H | 5R |
| $Z_2$ 1 2 4 | 4H | 5R |
| $Z_2$ 8 | 2H | 4R |
| $Z_2$ 1 8 | 5H | 4R |
| $Z_1$ 2 | 1H | 2R |
| $Z_1$ 1 2 | 4H | 2R |
| $Z_1$ 4 | 0H | 3R |
| $Z_1$ 1 4 | 3H | 3R |
| $Z_1$ 2 4 | 1H | 3R |
| $Z_1$ 1 2 4 | 4H | 3R |
| $Z_1$ 8 | 2H | 2R |
| $Z_1$ 1 8 | 5H | 2R |
| 1 | 3H | 0R |
| 2 | 1H | 0R |
| 1 2 | 4H | 0R |
| 4 | 0H | 1R |
| 1 4 | 3H | 1R |
| 2 4 | 1H | 1R |
| 1 2 4 | 4H | 1R |
| 8 | 2H | 0R |
| 1 8 | 5H | 0R |
| $Z_1$ | 0H | 2R |
| $Z_1$ $Z_2$ 1 2 8 | 6H | 6R |
| $Z_2$ 1 2 8 | 6H | 4R |
| $Z_1$ 1 2 8 | 6H | 2R |
| 1 2 8 | 6H | 0R |
| $Z_1$ $Z_2$ 4 8 | 2H | 7R |
| $Z_2$ 4 8 | 2H | 5R |
| $Z_1$ 4 8 | 2H | 3R |
| 4 8 | 2H | 1R |
| $Z_2$ | 0H | 4R |
| $Z_1$ 1 | 3H | 2R |
| $Z_1$ $Z_2$ | 0H | 6R |
| | 0H | 0R |

Dec. 29, 1959 H. S. BEATTIE ET AL 2,919,005

PRINTING APPARATUS

Original Filed Dec. 23, 1955

15 Sheets-Sheet 14

Dec. 29, 1959 H. S. BEATTIE ET AL 2,919,005

PRINTING APPARATUS

Original Filed Dec. 23, 1955 15 Sheets-Sheet 15

United States Patent Office 2,919,005

Patented Dec. 29, 1959

2,919,005

PRINTING APPARATUS

Horace S. Beattie, Lexington, Ky., and Theodore L. Buley, Poughkeepsie, and Bernard M. Muenzer, Hyde Park, N.Y., assignors to International Business Machines Corporation, New York, N.Y., a corporation of New York Original application December 23, 1955, Serial No. 555,026. Divided and this application May 13, 1958, Serial No. 734,972

12 Claims. (Cl. 197—49)

This invention relates to printing apparatus and more particularly to high speed printing apparatus wherein the print element is shifted to successive columnar printing positions.

This application is a division of our copending application Serial Number 555,026, filed on December 23, 1955.

The invention may be briefly described as comprising a single type element having numeric, alphabetic, and special characters embossed therein in distinct positional relationships. The print element is carried on a reciprocable carriage which is advanced so as to present the type element to successive print columns of a print record. A carriage carrying a hammer mechanism is advanced in synchronism with the columnar advance of the type element carriage and as the type element approaches each columnar print position, a type character selection motion is applied thereto to select the desired type character. The hammer may be selectively fired at any columnar print position to force a print sheet and an intervening ink ribbon against the selected type character to effect printing. The type character selection motion of the type element is effected under the control of set-up mechanism carried on stationary structure and which is connected through control cables to the type element to impart the selection motion thereto. The type element supporting structure on the type element carriage is of sufficient mass and rigidity to absorb the appreciable printing force applied to the type element by the hammer action, however the type element itself is relatively light so that it may be rapidly shifted between the various character print positions.

There is provided a novel so-called compensation carriage which reciprocates in synchronism with the type element carriage but at just one half the speed of the type element carriage. The compensating carriage includes pulleys over which the control cables are looped in their path between the set-up mechanism and the type element. The position of the compensating carriage compensates for the columnar position of the print carriage at all times so that the control cables are always maintained taut (but having no selection action on the type element). As a result, the actual selection motion of a control cable by the set-up mechanism has a fixed and accurate selection effect on the type element regardless of the columnar position of the type element carriage. The compensating carriage action separates the type selection action of the small mass type element from any inertia effects or loads of the large mass type element carriage. The more important loading effects that are thus separated from the type carriage selection action are the mass of the type carriage, and the forces utilized in driving the type carriage to successive columnar print positions. With the type element thus substantially free of external load effects, it may accordingly be very rapidly shifted from each desired type element position to the successive position. Successive type character selection is effected without the necessity for shifting the type element through a "home" position. The type element selection speed is such that the columnar advance of the carriage is continuous and not in steps so that printing takes place in each desired column on the "fly."

It is accordingly the principal object of the invention to provide a novel, high speed printer.

It is another object of the invention to provide a high speed printer having a multi-character type element which is advanceable to successive columnar print positions of a print record and wherein a type character selection motion may be imparted to said type element as it approaches each columnar print position, the type character selection actions being functionally independent and unaffected by the columnar advance action, and being responsive to coded control signals.

It is another object of the invention to provide a high speed printer having a multi-character type element which sweeps past a column of possible print positions and wherein selective character printing may be effected in any desired column as the type element advances therepast without stopping.

It is another object of the invention to provide a printing device having a multi-character type element of relatively small mass carried in a reciprocable type carriage of appreciable mass and structural rigidity, the small mass of the type element permitting it to be rapidly moved on said carriage to selected character print position, while the large mass and rigidity of the carriage including the supporting means for the type element permits a heavy printing pressure to be applied to the selected character of the type element from a hammer mechanism carried on a carriage reciprocable in unison with the type element carriage, as the latter is shifted through successive columnar print positions of a print record.

It is another object to provide a printing device as in the immediately preceding object wherein the heavy type element carriage is driven by a driving device, and wherein the type element is shifted on the type carriage by a character selection mechanism and wherein the carriage and selection drive systems are independent.

It is another object to provide a printing device as in the immediately preceding object wherein the type character selection action is imparted to the type element through cables controlled from set-up mechanism carried on stationary structure, the cables as they pass from the set-up mechanism to the type element operationally engaging pulleys on a compensating carriage, the compensating carriage compensating at all times for the columnar position of the type element carriage so that the control cables are always maintained taut (but yet having no selection action on the type element), so that the actual selection motion of a control cable by the set-up mechanism has a fixed and accurate selection effect on the type element regardless of columnar position of the type element carriage.

It is a still further object to provide a printing device as in the immediately preceding object wherein the compensating action separates the type selection action of the small mass type element from load effects of the large mass type carriage and its driving means.

It is another object of the invention to provide an improved print device having a print element having various print characters thereon, the print element being carried on a reciprocable carriage which is advanced to present the type element to successive print columns of a print record, the type element including set-up mechanism carried on stationary structure and controlled in response to combinationally coded received signals, said mechanism being connected through control cables to the type element to impart a type character selection motion thereto relative to the carriage, and wherein there is also provided a compensation carriage movable at one-half the speed of the print carriage and carrying pulleys over which the control cables pass in their path between the set-up mechanism and the print element, the position of the compensating carriage serving to compensate at all times for the position of the print carriage so that the control cables are always maintained taut and any selection motion of a control cable by the set-up mechanism has a fixed selection effect on the type element regardless of the columnar position of the print carriage.

Other objects of the invention will be pointed out in the following description and claims and illustrated in the accompanying drawings, which disclose, by way of example, the principle of the invention and the best mode, which has been contemplated, of applying that principle.

Figure 11:
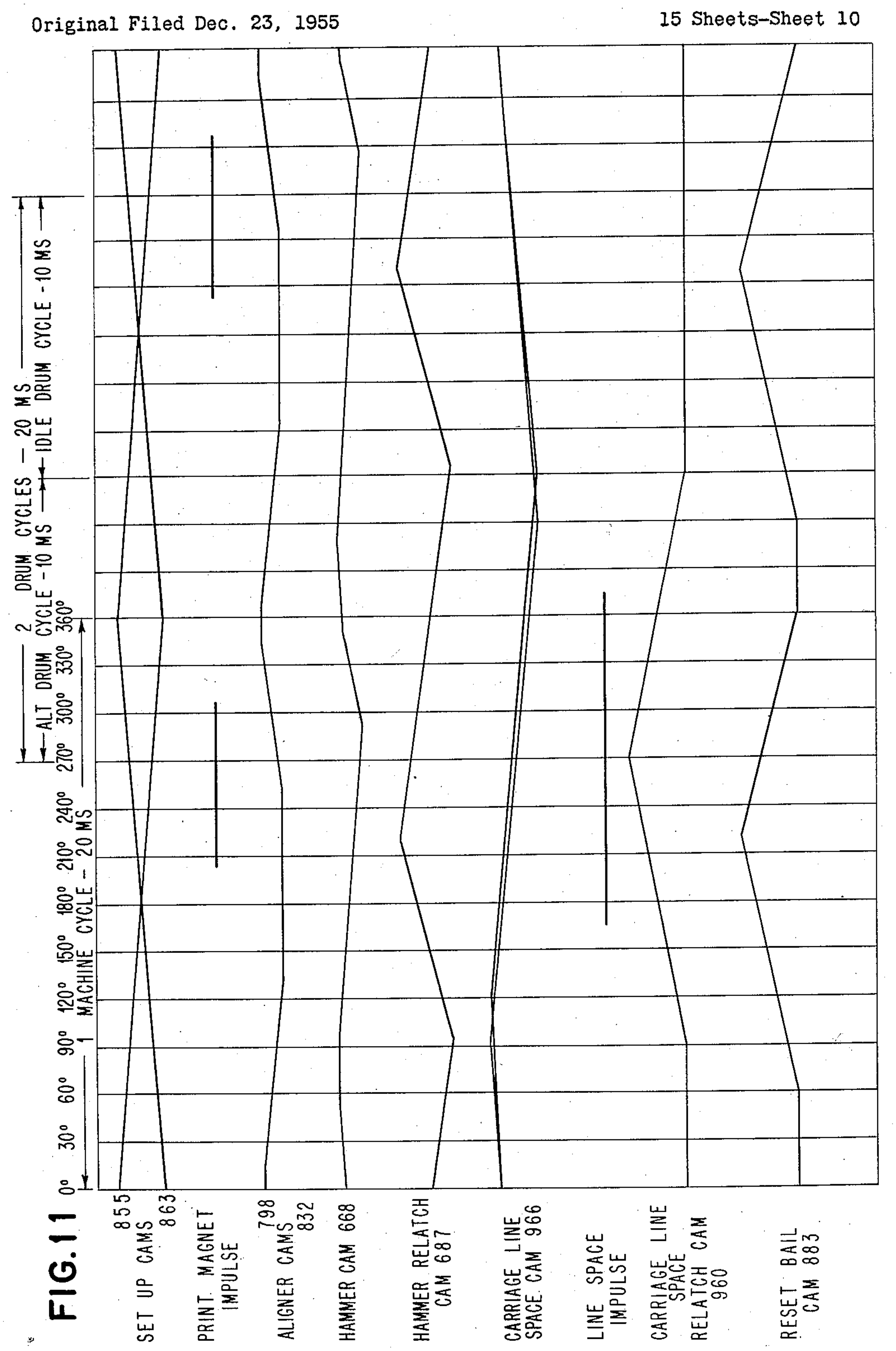

Fig. 11 comprises a timing diagram of the printing apparatus.

Figures 12, 21:
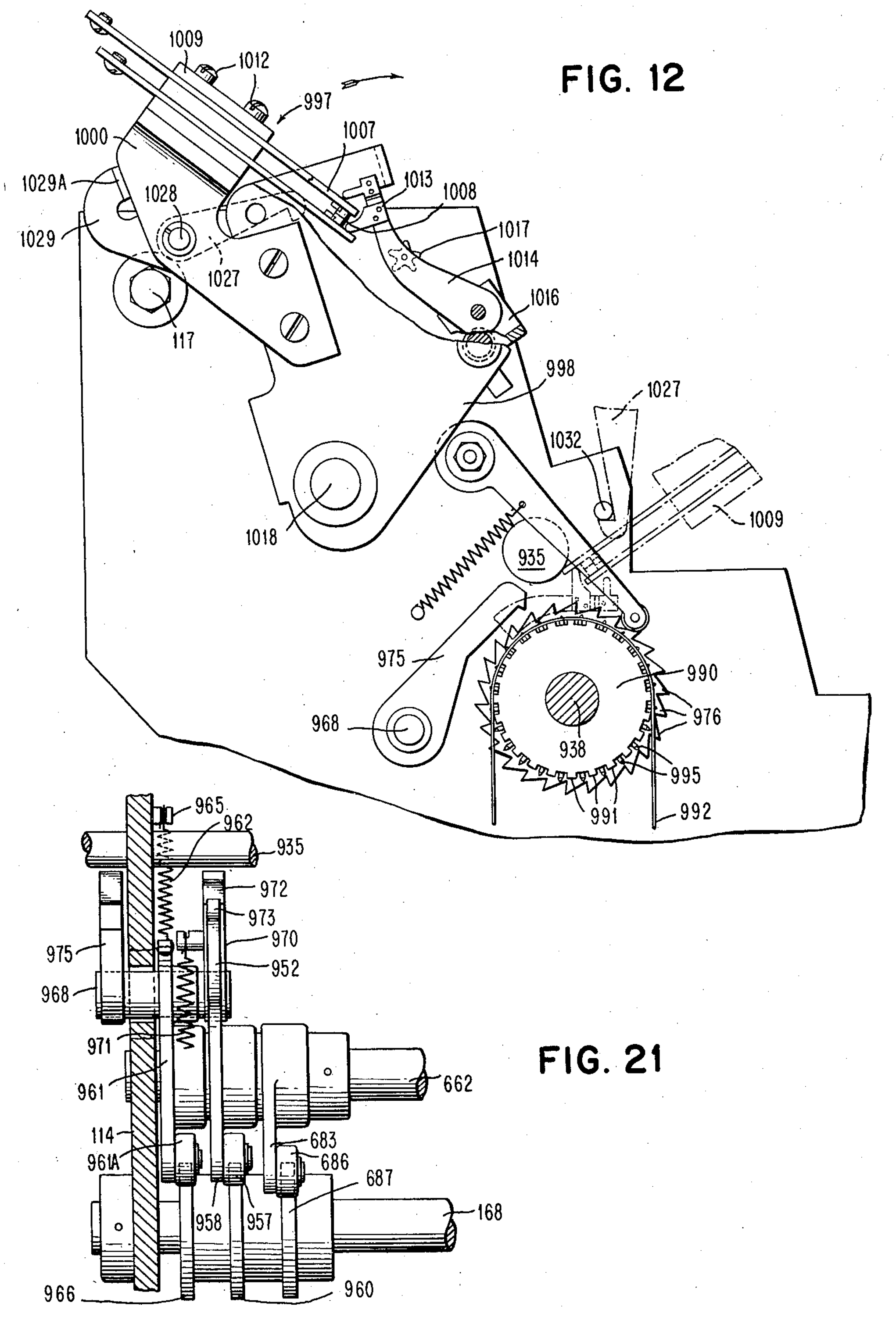

Fig. 12 is an elevational view of the print apparatus and shows the detail structure of the forms skip control device in an inoperative position clear of the control paper tape.

Fig. 13 is a conversion table showing the correlation between each possible binary coded signal print character and the equivalent print magnet operation for printing each such coded character. In Fig. 13 that portion of the table showing the type character is also representative of a development view of the single print element.

Fig. 14 is a diagrammatic representation of the single print element.

Fig. 15 is a table summarizing the equivalent type element operation to effect a printing of each such character.

Figure 5:
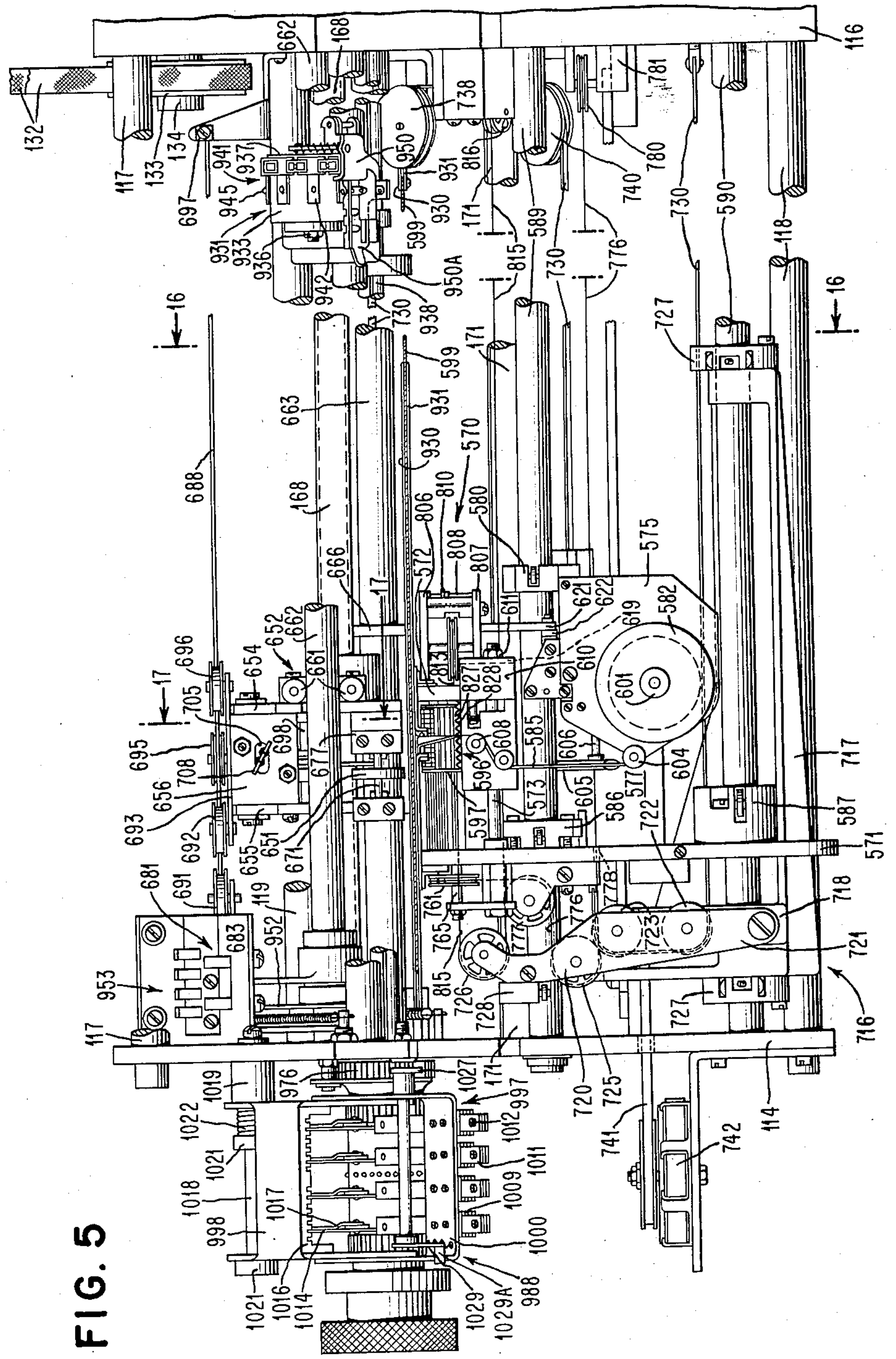
Fig. 5 is a detail plan view of the print mechanism.
Figure 16:
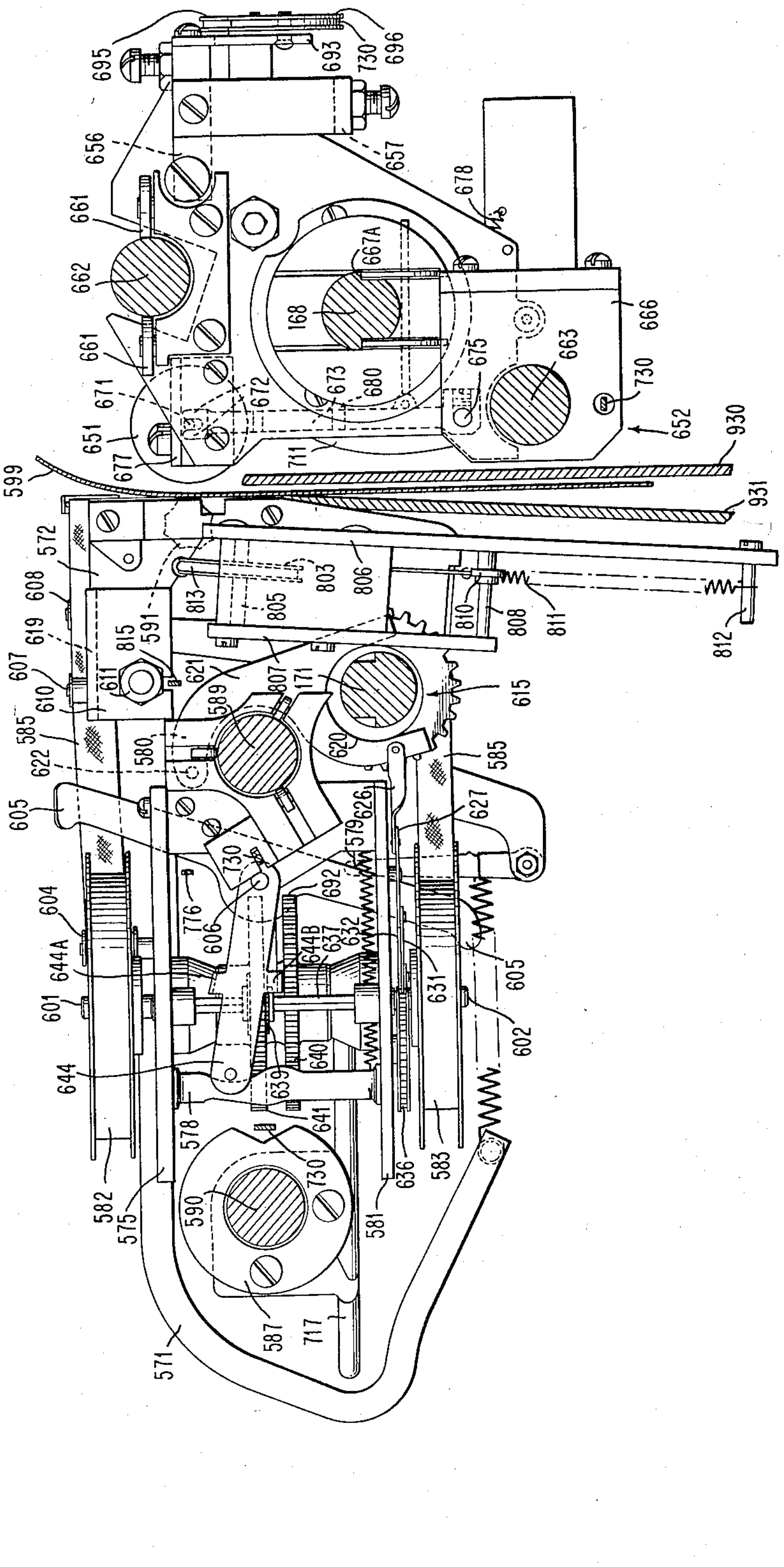

Fig. 16 is a partial vertical section taken on the plane of the line 16—16 of Fig. 5.

Figure 17:
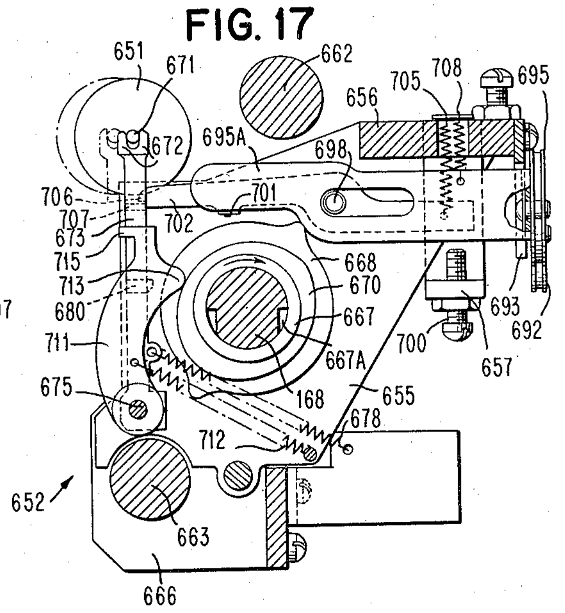

Fig. 17 is a vertical section taken on the plane of the line 17—17 of Fig. 5 through the hammer carriage.

Figure 18:
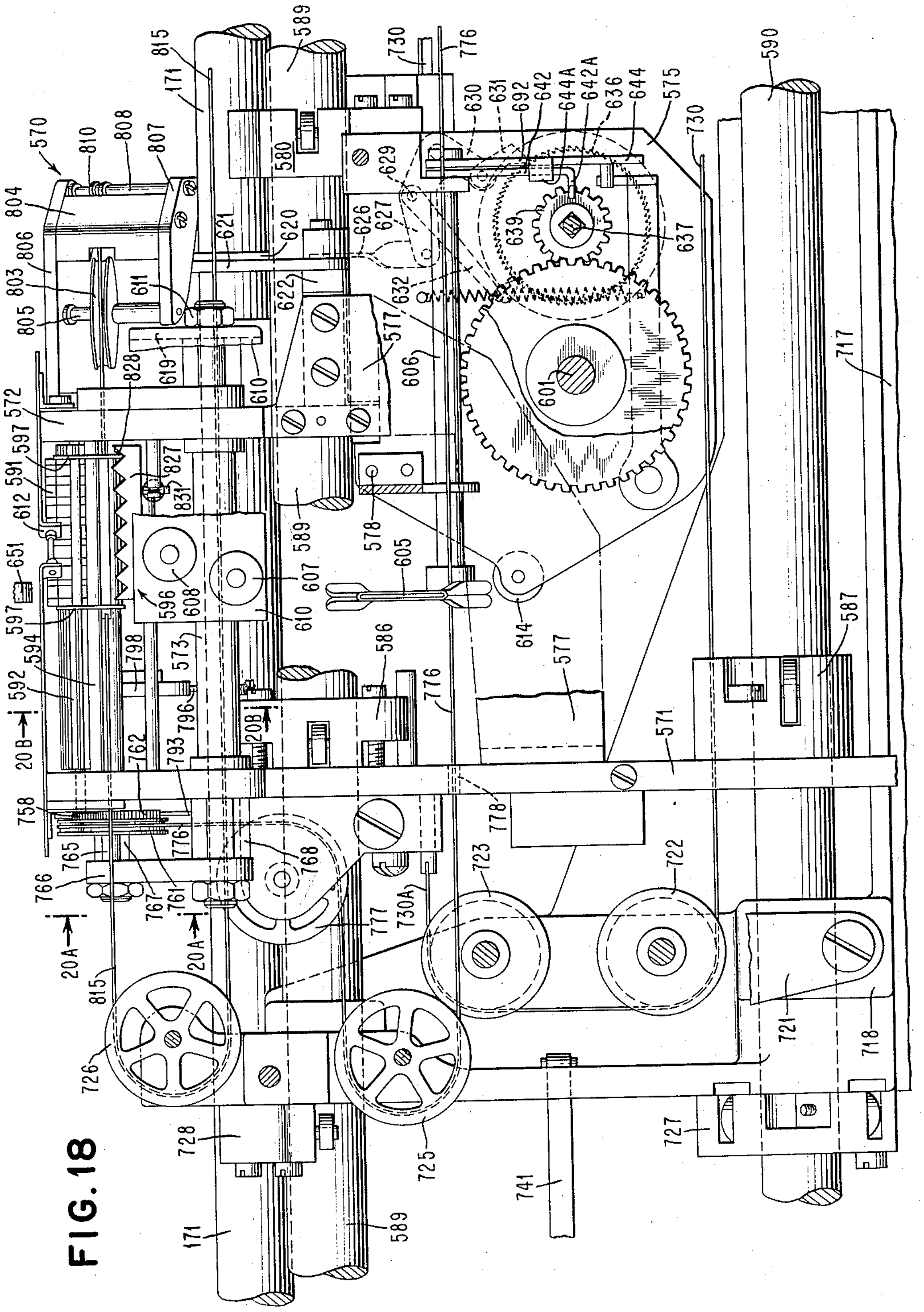

Fig. 18 is a partial enlarged plan view of the print apparatus.

Figure 1:
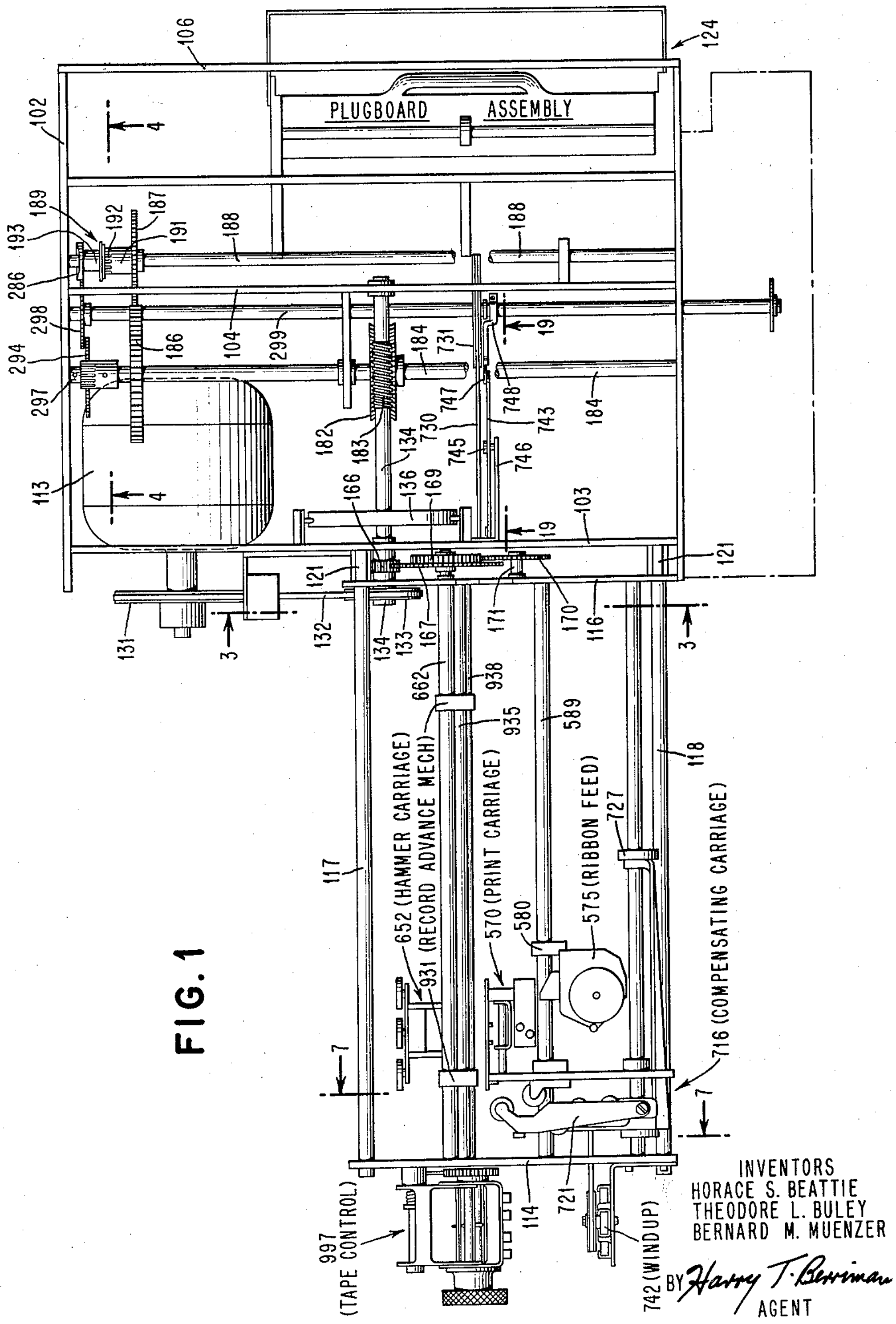
Fig. 1 is a simplified plan view of mechanical structure of the improved printing apparatus, various parts being deleted to aid in illustration.
Figure 20A:
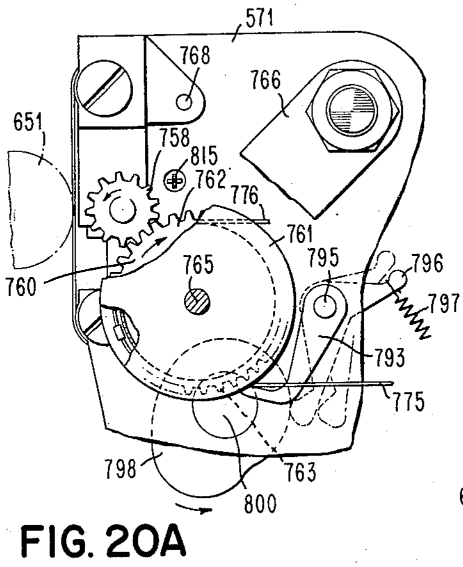
Figures 19, 20B:
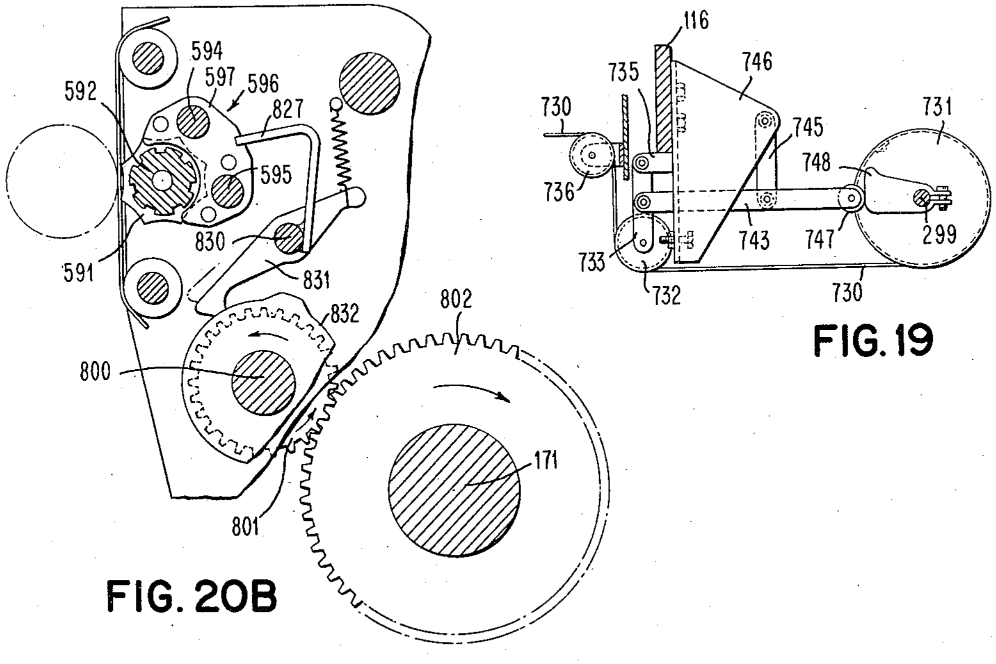

Fig. 19 is a vertical section taken on the plane of the line 19—19 of Fig. 1 and shows the detail construction of the carriage advance mechanism.

Fig. 20A is a vertical section taken on the plane of the line 20A—20A of Fig. 18.

Fig. 20B is a vertical section taken on the plane of the line 20B—20B of Fig. 18.

Figure 7:
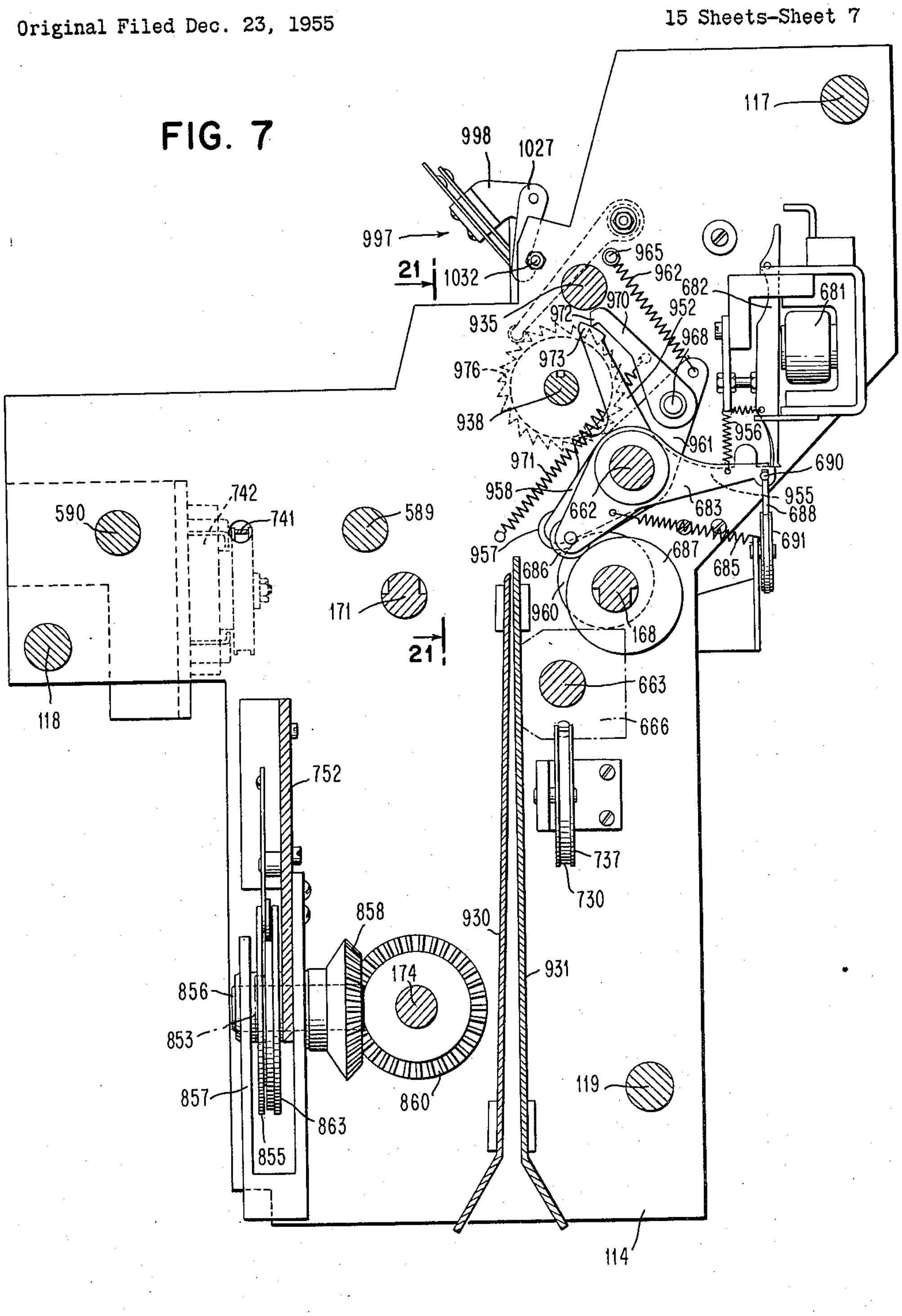
Fig. 7 is an enlarged vertical section view taken on the plane of the line 7—7 of Fig. 5, Fig. 7 having some parts removed to facilitate illustration.

Fig. 21 is a vertical section taken on the plane of the line 21—21 of Fig. 7.

In the drawings the improved printing apparatus is shown in conjunction with portions of an accounting machine with which it is utilized, the accounting machine itself being fully described and claimed in copending patent application, Serial Number 555,026 filed December 23, 1955, this instant printer application being a division of the above cited application. In the instant application only those portions of the associated accounting machine which aid in understanding the improved printer will be described.

Figure 2:
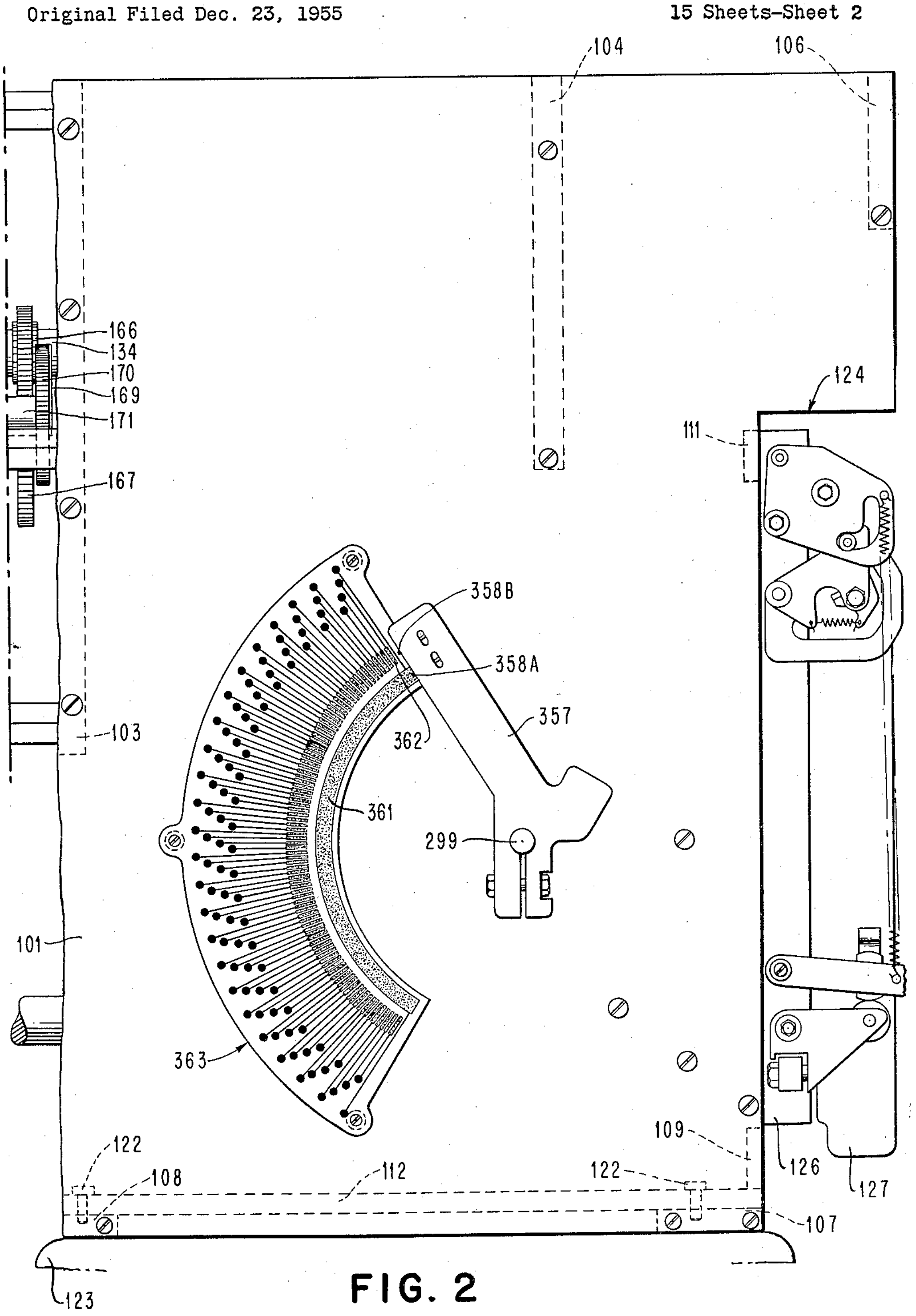
Fig. 2 is a partial front elevation view of the mechanical structure of the improved printing apparatus with one of the frame members being partially broken away to facilitate illustration.
Figure 3:
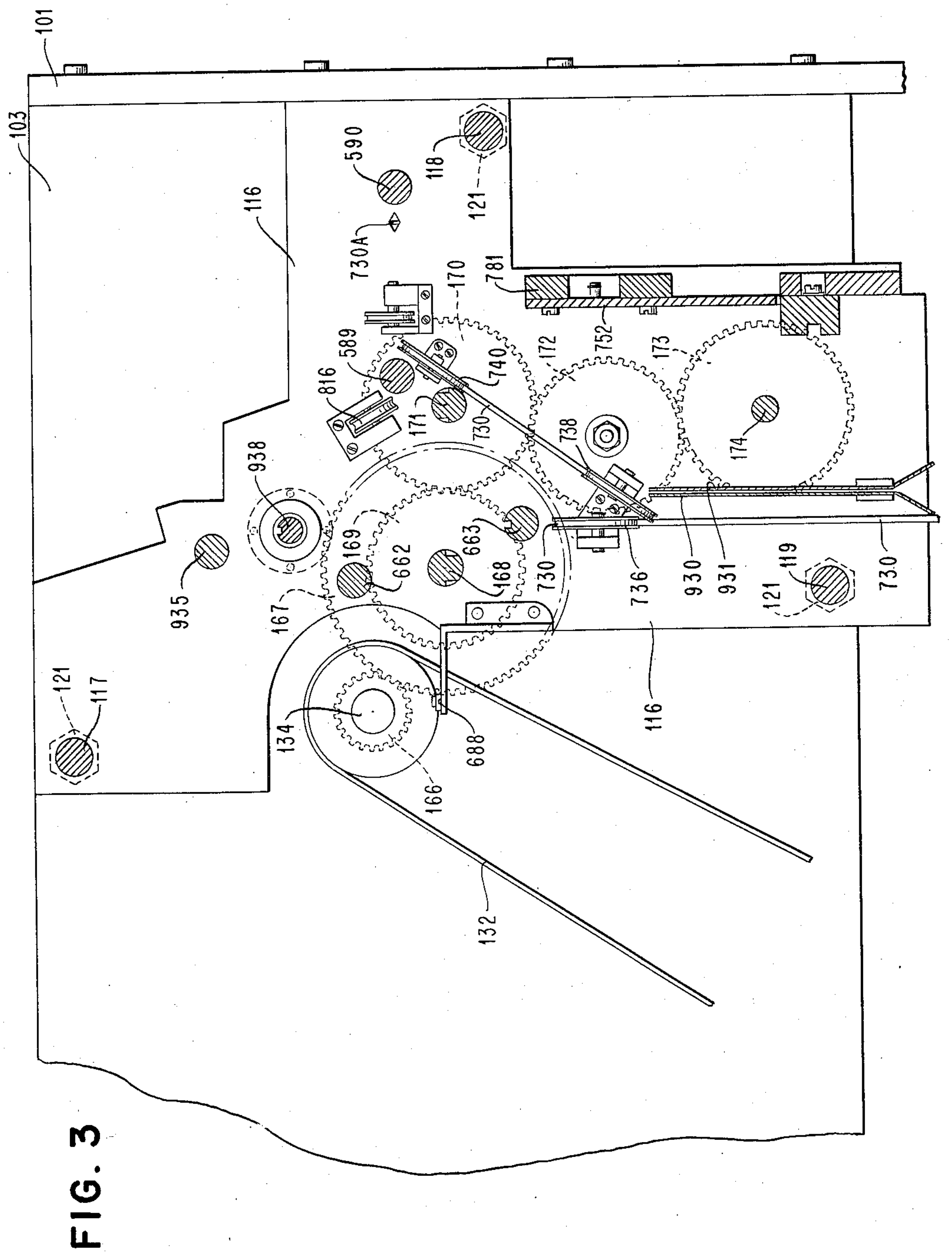
Fig. 3 is a vertical section view taken on the plane of the line 3—3 of Fig. 1.

Referring now to Figs. 1 and 2, the supporting structure of the particular accounting machine to which the subject printing apparatus is attached comprises a vertical front plate 101 and back plate 102 tied together by cross plates 103, 104 and 106 and cross bars 107, 108, 109 and 111. A plate 112 (Fig. 2) is secured to the cross bars 107 and 108 and supports a drive motor 113 for the accounting machine and the associated printing device. The supporting structure of the print device itself comprises a left end plate 114 and right end plates 116 tied together by cross rods 177, 118 and 119 (Figs. 1 and 3). The right end plate 116 is rigidly secured to and spaced from the cross plate 103 of the accounting machine by spacers 121. The space between the plates 103 and 116 forms a housing in which are arranged some of the various driving gear trains of the printing device and associated accounting machine.

Bolts 122 (Fig. 2) through the cross bars 107 and 108 secures the above described structure to the top of a base housing 123 in which are arranged the various electronic and relay circuits of the machine. Secured to the cross bars 109 and 111 is a conventional plugboard assembly 124 having a fixed contactor panel 126 and a removable plugboard control panel 127. Various electrical cables from the relay and electric circuits in the housing 123, extend through suitable openings in the top thereof and are permanently wired to the usual wiper type contact member of the fixed panel 126. The usual mating contact wiper is provided on the movable panel 127 for each of the contact wipers of the fixed panel, and with the panel 127 in place, the mating wipers of the two panels are engaged. Each of the wiper contacts on the removable panel 127 is electrically connected to an associated plug hub thereon. With the panel 127 in place, the various electrical control circuits etc. of the machine are accordingly interconnected as determined by the usual plug wires plugged between the various plug hubs.

*Mechanical drive*

Referring now to Fig. 1, there is shown the mechanical driving chain for the various mechanisms of the printing device and associated accounting machine. The chain comprises the motor 113 which through an associated pulley 131, belt 132 and a pulley 133 secured to a so-called main drive shaft 134, continuously rotates the shaft 134 which is supported by suitable bearing inserts in the cross plates 103 and 104. A magnetic storage drum 136 is secured to the shaft 134 and has a plated circumferential storage surface sufficient to accommodate a plurality of spaced storage tracks.

Secured to the cross plate 103 and arcuately arranged around the storage drum 136 for cooperation therewith are appropriate magnetic heads (not shown) for reading, writing and recording in the storage tracks. The storage drum includes a so-called clock track (not shown) which is comprised of a series of teeth cut in the drum. The teeth are magnetized and as each rotates under an associated read head carried on the plate 103, a "clock pulse" is induced therein. The clock pulses are utilized for initiating and timing various machine and printing functions as will be later evident. The speed of the motor 113 and the belt-pulley driving arrangement to the shaft 134, is such that the shaft 134 is continuously rotated at a speed of approximately 6000 r.p.m. This gives a drum speed of one revolution per ten milliseconds.

The main drive shaft 134 through a gear 166 (see Fig. 3), drives a gear 167 secured to rotatably mounted shaft 168. The shaft 168 through another gear 169 secured thereto, drives a gear 170 secured to a shaft 171, the gear 170 through a meshing idler 172 driving a gear 173 secured to a rotatably supported shaft 174. The purposes of these driven shafts 168, 171 and 174 will be later evident.

The main drive shaft 134 acts through a worm gear 182 (Fig. 1) secured thereto and a meshing gear 183 secured to a shaft 184 to continuously rotate the latter, the shaft being supported by suitable bearing inserts in the front plate 101 and back plate 102. The shaft 184, in turn, through a gear 186 (Fig. 1) secured thereto, continuously rotates a gear 187 which is rotatably mounted on a so-called program shaft 188, the shaft 188 being rotatably supported by the front plate 101 and back plate 102.

Figure 4:
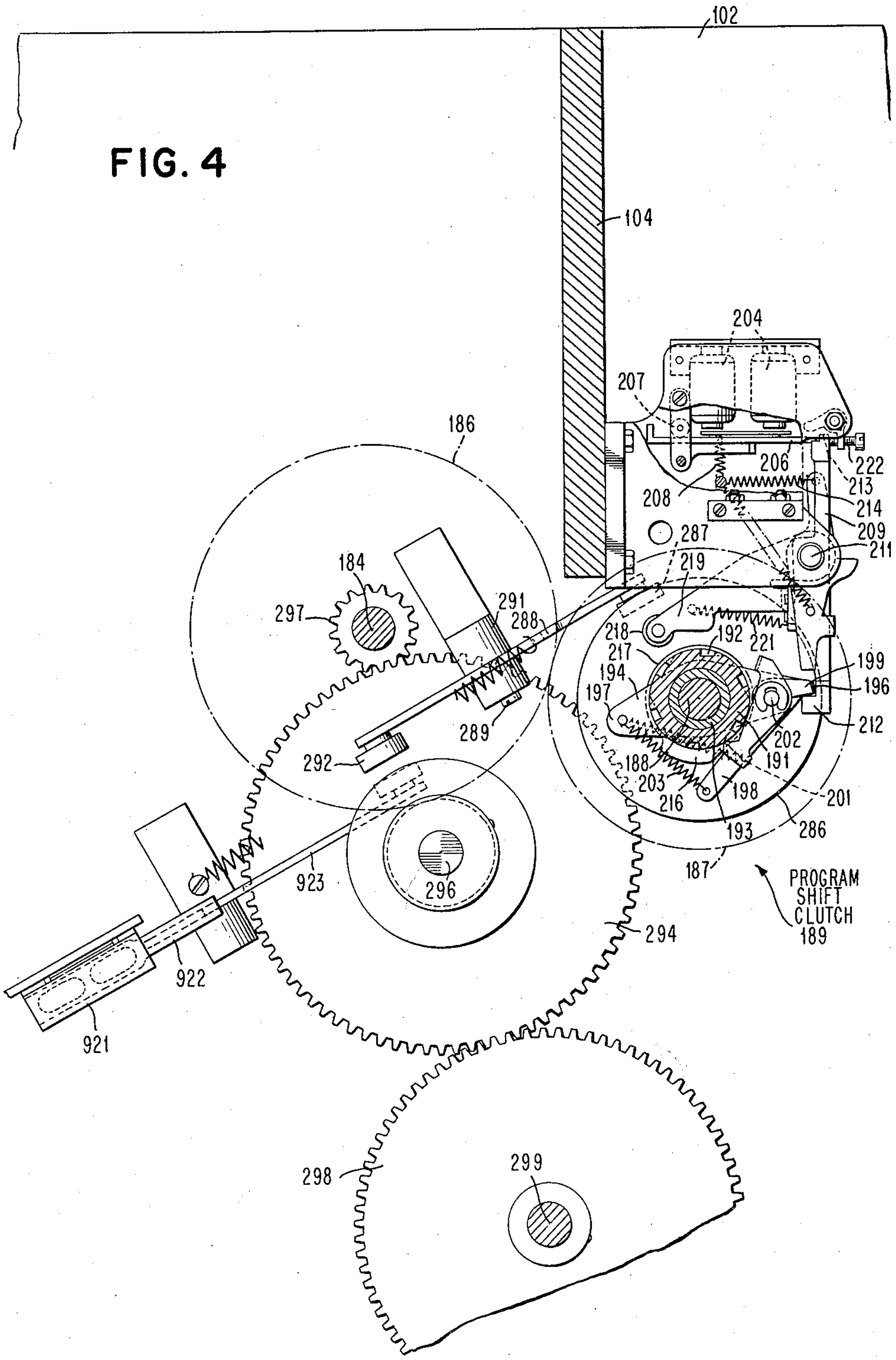
Fig. 4 is a vertical section view taken on the plane of the line 4—4 of Fig. 1, with various parts being indicated in phantom to facilitate illustration.

The gear 187 is a component part of a well-known pawl-ratchet type single revolution clutch 189, the latter also being referred to hereinafter as the program shaft clutch. The gear 187 includes an integral extending collar portion 191 having eight spaced notches 192 around the periphery thereof, as shown in Fig. 4, the hub 191 serving as the driving "ratchet portion" of the clutch.

Secured to the shaft 188 is a collar 193 which, in turn, has a pawl arm 194 secured thereto, the arm 194 having a nose portion 196 and tail portion 197. A clutch pawl 198 having a nose portion 199 and a toothed portion 201 is pivotally mounted at 202 to the arm 194. The pawl 198 is continuously biased clockwise in Fig. 4 relative to the arm 194, by a spring 203 linking a lower end of the pawl 198 and the tail 197 of the arm 194.

The clutch 189 includes an actuating magnet 204 having an armature 206 pivoted at 207. With the magnet 204 unenergized, an armature return spring 208 urges the armature 206 free of the cores of the magnet 204 so that the end of the armature 206 abuts the upper end of a latch arm 209, the latter being pivoted at 211 to stationary structure. With the arm 209 in the position shown in Fig. 4, the noses of both the arm 194 and its associated pawl 198 engage a hooked lower end 212 of the arm 209, thus latching the toothed portion 201 of the pawl clear of the ratchet collar 191 of the continuously rotating gear 187. This is referred to as the latched position of the clutch.

To engage the clutch, the magnet 204 is impulsed which attracts the associated armature 206 so that the end thereof moves free of the upper end of the latch arm 209 and into alignment with a recess 213 thereof. The latch arm 209 is accordingly freed for limited rotation counterclockwise in Fig. 4 under the urging of an associated spring 214. As the latch arm rotates, the hooked lower end 212 thereof releases the clutch pawl arm 194 and clutch pawl 198. As a result, the clutch pawl 198 rotates clockwise around its pivot 202 under the urging of spring 203 until the toothed portion 201 rests against the ratchet collar 191 of the continuously rotating gear 187. As the next notch 192 in the ratchet rotates into alignment with the toothed portion 201, the latter drops therein and locks the pawl to the ratchet 191. Since the pawl 198 and associated pawl arm 194 are secured to the collar 193 which in turn is secured to the shaft 188, the program shaft 188 is accordingly rotated clockwise in Fig. 4 with the ratchet 191.

As the collar 193 rotates, a high dwell 216 in an associated cam 217 secured thereto engages a roller 218 on a so-called knockoff arm 219 to rock the arm clockwise in Fig. 4 on its mounting pivot 211. As the knockoff arm rocks, the tension of a spring 221 connected therefrom to the latch arm 209, is increased sufficiently to overcome the tension of the spring 214. As a result, the latch arm 209 restores clockwise and into engagement with a stop 222, the upper end of the arm 209 relatching on the end of the now restored armature 206, and its lower hooked end 212 again extending into the rotational path of the noses of the clutch pawl arm 194 and the clutch pawl 198.

It will be recalled that with the release of the clutch pawl 198 and clutch pawl arm 194 by the latch arm 209, the clutch pawl 198 rotated relative to the pawl arm 194 so as to engage the pawl with the ratchet 191. This rotation causes the nose of the pawl 198 to "lead" the nose of the pawl arm 194 during their subsequent rotation with the ratchet 191. As a result of this "lead" of the pawl 198, it engages with the restored latch arm after slightly less than one revolution of the shaft 188. With the pawl 198 latched, the further rotation of the shaft 188 displaces the pawl 198 counterclockwise on its pivot 202 relative to the pawl arm 194 so as to lift the pawl tooth 201 from driving engagement with the ratchet 191. The clutch 189 is accordingly relatched in the position indicated in Fig. 4 after one complete revolution of the shaft 188 and rotation of the shaft 188 ceases. With the clutch latched, the gear 187 again rotates freely in the shaft 188. It is thus evident that for each impulsing of the program shaft control magnet 204, one revolution of the program shaft 188 is effected.

*Mechanical drive—the emitter shaft*

Referring again to Fig. 1 it will be noted that also secured to the shaft 188 for rotation therewith is a cam 286 which is engaged by a roller 287 (Fig. 4) carried by one arm of a spring biased follower 288, the latter being mounted on a pivot 289 carried by a block 291 which is secured to the back plate 102. Another arm of the follower 288 carries a roller 292 which extends into the plane of a gear 294. The gear 294 is rotatably mounted on a stub shaft 296 which is secured at one end of the plate 102. The gear 294 meshes with a splined member 297 of the shaft 184 and is continuously rotated thereby. The gear 294 is movable on the shaft 296 between a position wherein it meshes with a gear 298 secured to a so-called emitter shaft 299, which is rotatably supported in suitable bearing inserts carried by the plates 101 and 102, to a position wherein the gear 294 is free of engagement with the gear 298.

Upon an impulsing of the control magnet 204 of the program clutch 189, the clutch is engaged and the program shaft 188 and associated cam 286 are driven by the gear 187. At the beginning of the #11th drum cycle of the program shaft rotation, a dwell of the cam 286 acts against the roller 287 and displaces the follower 288 against the tension of an associated spring. As the follower rotates the roller 292 carried by the other arm of the follower 288 acts against the forward surface of the gear 294 in Fig. 4 and accordingly displaces the gear 294 on the shaft 296 so as to engage its teeth with the gear 298 on the shaft 299. As a result, the shaft 184, through gear 294 and gear 298, effects a rotation of the emitter shaft 299 from a so-called home position. After the motion of the follower 288 by which the gear 294 and 298 are engaged, the roller 287 drops from high dwell portion 301 of the cam 286 to restore the follower 288 to its normal position. This restoring motion of the follower 288 has no effect on the engaged position of the gears 294 and 298, however, and rotation of the emitter shaft 299 continues.

Referring now to Figs. 1 and 2 it will be noted that the emitter shaft 299 extends through the front plate 101 and secured thereto is a rotator 357 carrying a pair of electrically commoned contact wipers 358A and 358B for cooperation with the common segment 361 and 80 individual segments 362, respectively, of a so-called print position control emitter 363 which is secured to the front plate 101. Each of the segments 362 thereof is connected to a related hub on the panel 127. The wipers 358A and 358B are electrically connected together. During each counterclockwise rotation of the emitter shaft 299 in Fig. 2 each of the segments 362 of the plate 363 is engaged successively by the associated wiper 358B, The purpose of the print position emitter 363 will be later explained.

*The print device*

Referring now to Figs. 1 and 5, the improved printing apparatus includes a print element carriage, generally designated 570 in Figs. 1 and 5, the carriage comprising parallel frame members 571 and 572 (Figs. 5 and 42) which are tied together by suitable cross rods such as rod 573 in Fig. 5. The plates 571 and 572 are also tied together by structure comprised of a top plate 575, which is secured to the right end frame 572, the plate 575 in turn being rigidly fastened through a cross member 577 to the left end plate 571. Rigidly spaced parallel to the top plate 575 by a tie member 578 (Figs. 16, 18) and a tie block 579, is a bottom plate 581. The structure comprised of the top plate 575 and bottom plate 581 supports spools 582 and 583 for an inked ribbon 585 of the printing device, in a manner to be explained. The left frame member 571 of the carriage 570 carries bearing members 586 and 587 (Fig. 5) while the right end block 580 includes similar bearing surfaces, by which the carriage 570 is slidably mounted on suitable guide rods 589 and 590, the guide rods being supported by and extending between the stationary end plates 114 and 116.

Referring now to Fig. 14, the actual printing element of the print device comprises a single prismatic print element 591 having 47 separate type characters embossed thereon, as best shown in a development view of the print element surface in Fig. 13. It will be noted that the 47 possible print characters are arranged on the print element 591 in 7 bands with each band being divided angularly into 8 equal type element areas. The print character areas of all the "bands" are aligned so that, in effect, 8 angularly spaced "lines" of type are formed. The 7 bands of type are labeled from 0 through 6 for reference purposes, as indicated in Fig. 13. In a similar manner, the 8 angular "lines" of type are labeled from 0 through 7. The print element is slidably supported in a horizontal position on a splined shaft 592 (Figs. 18, 23) which is rotatably supported by non-splined end portions engaging suitable bearing inserts in the plates 571 and 572 of the carriage 570. The splines of the shaft 592 are engaged by inner projecting portions of the print element thus "locking" the element to the shaft 592 for angular movement therewith.

Supported by the plates 571 and 572 and extending therebetween parallel to the shaft 592, are rods 594 and 595 (Figs. 18 and 20B) which slidably support a member 596. The member 596 has projecting end portions 597, each of which engages a related end of the print element 591. By moving the member 596 on its supporting rods, in a manner to be explained, an equivalent horizontal movement of the print element on its supporting shaft 592 is effected.

There is provided suitable record sheet feeding and record guiding mechanism to be later explained, for maintaining a printing surface of a record 599 (Fig. 5) in a vertical plane adjacent to the movement path of the carriage 570. To effect a printing operation on a particular line of the print record 599, the carriage 570 is advanced from left to right in Figs. 5 and 6 to present the print element 591 successively to the columns of an adjacent print line of the record 599. The carriage 570 is advanced, column by column, through a maximum of 80 columnar positions of the record 599, the column by column advance action being continuous and not an incremented step by step advance.

Referring now to Fig. 13, it will be noted that the type area at the intersection of the 0 band and 0 angular line is blank. This type area is referred to as the "home" type area. It will be noted in Fig. 13 that some of the type areas in the 5 and 6 band are also blank. With the type cylinder in a so-called "home" position, the "home" type area is positioned at the printing line of the particular column of the record in which the carriage 570 is positioned. During the advance of the carriage into each desired print column, the actual character to be printed therein is selected by the combined actions of shifting the print element 591 horizontally on the shaft 592, by the action of member 596, from 0 to 6 band positions; and rotating the element on its supporting shaft, from 0 to 7 angular increments. It will be appreciated that a type selection operation positions the element 591 relative to the carriage 570 so as to position the selected character in the position occupied by the home type area when the print element is in its so-called "home" position. For example, assuming the print element as initially in its "home" position, a subsequent shifting of the cylinder three band increments to the right (towards frame 571) in Fig. 18, and a simultaneous rotation of the cylinder through 6 angular increments, positions the type element A at the print line of the particular column of the record with which the carriage is then aligned.

It is evident from the above discussion that through the application of proper combinations of horizontal and rotational movement to the print element, this action being effected under the control of a so-called set-up mechanism generally designated 600 in Fig. 6, which will be later explained, any one of the 47 type characters on the print element may be selected for printing. The arrangement of the set-up mechanism is such that on successive print operations, the print element is moved directly from one character to the next without an intervening homing action. Due to the high type selection speed thus obtained, the column by column advancing motion of the carriage is continuous and unvarying so that printing is actually effected in each desired column on the "fly."

*Print device—The ribbon supply mechanism*

Figure 6:
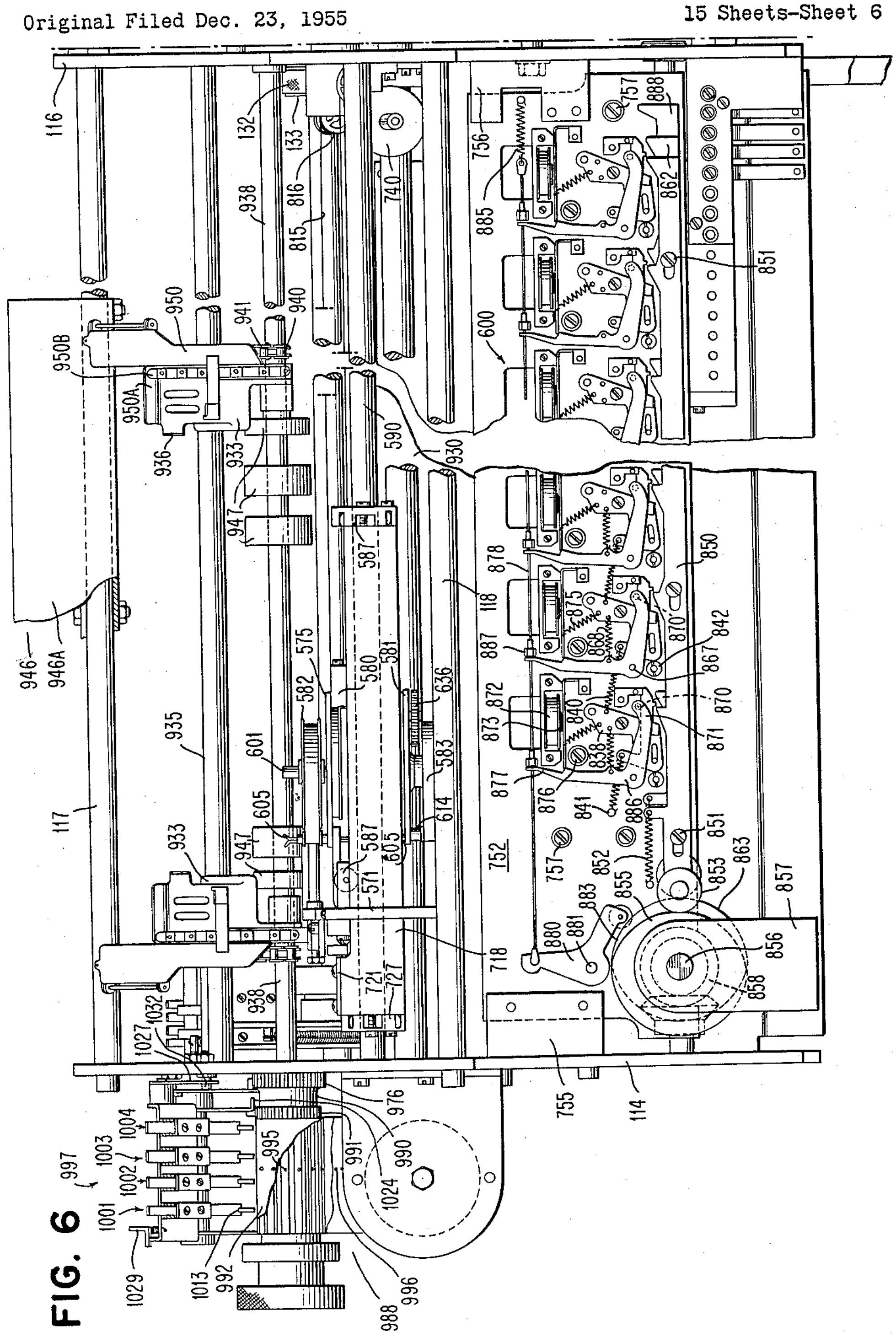
Fig. 6 is a front detail elevation view of the print mechanism.

Referring now to Figs. 5, 6 and 16, the inked ribbon supply mechanism of the print device comprises the upper ribbon spool 582 which is secured to a shaft 601 rotatably supported by the top plate 575 of the carriage 570, and the lower ribbon spool 583 which is secured to a shaft 602 rotatably supported by the bottom plate 581 of the carriage 570. The common inked ribbon 585 carried by the spools 582 and 583 extends therebetween in a path from the spool 582 over guide roller 604 mounted on top plate 575, and then through the top guide portion of a guide finger 605 which is secured at its midpoint to a shaft 606, the shaft being pivotally supported on an extending portion of the block 580. The ribbon path continues over guide rolls 607 and 608 carried by a plate member 610 secured with fastening 611 to the right frame 572 of the carriage, over a guide member 612, which guides the ribbon 585 vertically and adjacent the "print position" of the print element (the guide member 612 being supported at its ends by frames 571 and 572), over a pair of rollers similar to rollers 607 and 608, and carried by carriage structure, through a lower guide portion of guide finger 605, and over a guide roller 614 (Fig. 6) carried on plate 581, to the lower ribbon spool 583.

Driving mechanism is provided for the spools 582 and 583 which is automatically shifted, in a manner to be explained, so that if the majority of the inked ribbon 585 is wound on spool 582, the associated spool 583 is continuously and positively driven to serve as a ribbon take-up spool with the spool 582 serving as an idler supply spool; while if the majority of the inked ribbon 585 is wound on the spool 583, the associated spool 582 is continuously and positively driven counterclockwise in Fig. 5 and serves as the ribbon take-up spool, with spool 583 serving as the idler ribbon supply spool.

Referring now to Figs. 5, 16 and 18, the driving means for the ribbon comprises the previously mentioned driven shaft 171 which is rotatably supported by suitable bearing inserts carried by the end frames 114 and 116. The ribbon drive includes a collar 615 (Fig. 16) which is slidable lengthwise on the driven shaft 171 but is "locked" to the shaft for angular movement therewith by the engagement of the inner projecting portion of the collar 615 with the splines of the shaft 171. The collar 612 contains a recess 617 which is engaged by a downwardly projecting member 619 rigidly secured to the plate 610. The arrangement is such that as the carriage 570 is advanced on its guide shafts 589 and 590, the collar 615 is advanced therewith on the shaft 616 through the engagement of the member 619 with the collar.

The collar 615 includes an eccentric cam portion 620 (Fig. 16) which is engaged by a follower 621 pivoted at 622 to fixed carriage structure 624. A link 626 connects the follower 621 to the one arm of a two armed lever 627 (see Fig. 18) which is pivoted at 629 to fixed carriage structure. Pivotally mounted on the one arm 630 of lever 627, is a pawl 631. A similar pawl 632 is mounted on the other arm 634 of the lever 627. Each of the pawls is tensioned by an associated spring so as to maintain its nose engaged with a ratchet wheel 636 secured to a shaft 637. The shaft 637 is rotatably supported by suitable bearing inserts carried by the previously mentioned top and bottom plates 575 and 581 of the carriage. It should be noted in Fig. 18 that the pawls 631 and 632 engage the ratchet 636 in opposite directions.

With the shaft 171 rotating, the cam 620 through the linkage traced above rocks the lever 627 through an angle sufficient to displace the related pawls 631 and 632 a distance equal to one tooth of the ratchet 636. As the lever 627 rocks clockwise in Fig. 18, the pawl 631 acts as a driving pawl to advance the ratchet 636 clockwise one tooth position. During this action the pawl 632 serves only as a detent pawl. On the subsequent counterclockwise rocking of lever 627, the functions of the pawls 631 and 632 are interchanged with pawl 632 effecting a one tooth clockwise advance of the ratchet 636 while pawl 631 serves as a detent pawl. It is thus evident that a two tooth clockwise advance (in Fig. 18) of ratchet 636 is effected for each rocking cycle of the lever 627.

A gear 639 (Fig. 16) is secured to the shaft 637 for rotation therewith but is displaceable lengthwise on the shaft between a first position wherein the gear 639 meshes with a gear 640 secured to the support shaft 602 of the spool 583, and a second position wherein the gear 639 meshes with a gear 641 secured to the support shaft 601 of the spool 582. It is evident that when gear 639 is in its first position, the shaft 637 drives the shaft 602 and associated spool 583 so that the spool 583 functions as a ribbon take-up spool with the spool 582 serving as an idler ribbon supply spool, in the manner previously described. Similarly, when gear 639 is in its second position, the shaft 637 drives the shaft 601 and associated spool 582 so that the spool 582 functions as the driven ribbon take-up spool with the spool 583 serving as the idler supply spool.

The gear 639 is shifted from its first to its second position under the control of a forked lever 642 which is pivotally supported on the projecting end portion of the previously mentioned support shaft 606 of the ribbon guide finger 605. An upper arm 642A (Fig. 18) of the fork 642 extends into a plane above the gear 639, while the lower arm 642B thereof extends into a plane below the gear 639. Secured to the shaft 606 adjacent the lever 642, is another forked lever 644 (see also Fig. 16), an upper arm 644A thereof extending in a plane above the arm 642A of lever 642, while a lower arm 644B thereof extends into a plane below the arm 642B of lever 642. With the lever 644 positioned so that the arm 644A thereof engages the arm 642A of lever 642 the associated gear 639 is engaged with the gear 640. As a result, the ribbon 585 feeds from the idler spool 582 to the driven spool 583. Shortly before the ribbon is exhausted from the upper spool 582, a metal eyelet carried by the ribbon engages the upper guide portion of the finger 605, and as the ribbon continues to advance, the eyelet rocks the finger 605 and its associated shaft 606 into the position indicated in Fig. 16. As the shaft 606 rocks clockwise, the lever 644 rocks therewith and the arm 644B engages the arm 642B of lever 642 to displace the gear 639 upward on its shaft free of engagement with the gear 640 of the lower spool 583 and into engagement with the gear 639 of the upper spool as indicated. The ribbon feed is accordingly reversed, with the upper spool 582 now serving as the driven take-up spool and lower spool 583 serving as the supply spool. Shortly before the ribbon is exhausted from the lower spool 583, an eyelet near the associated end of the ribbon rocks the finger 605 to reverse the functions of the two spools.

Secured to the lever 644 is a pin (not shown) which extends into the plane of a cam surface portion of a lock lever (not shown). The lock lever is pivotally mounted on a shaft which is supported by the top plate 575 and bottom plate 581. A spring connected between the lock lever and fixed structure of the carriage maintains the associated cam surface engaged with the pin of lever 642. As the lever moves from one operational position towards the other, the associated pin passes over a high midpoint section of the cam surface of the lock lever. As the pin advances beyond the high midpoint, the following cam surface through the tensioning action of the spring acting on the lock lever, acts against the pin of lever 642 to positively throw the lever 642 completely into the desired operational position. Once the lever 642 is in the one or the alternate operational position, the tensioning action of the lock lever (not shown) maintains it in the desired operational position until the next ribbon drive transfer operation.

After the desired type character is selected for printing in a column as described above, the actual physical printing operation is effected by the "firing" of a print hammer 651 (Fig. 17) which forces the print record 599 and the interposed ink ribbon 585 carried by the carriage 570, against the "selected" type character. The hammer 651 is carried on its own individual carriage, generally designated 652 in Fig. 5.

*Print device—The hammer carriage*

The hammer carriage 652 comprises a right end frame 654 and a left end frame 655 (Fig. 5) rigidly tied together by a top plate 656 and a U-shaped member 657 (Figs. 16 and 17). The carriage 652 is slidably mounted for movement in a path parallel to the type carriage 570 by the engagement of suitable bearing members (not shown) carried by the frames 655 and 654, respectively, with guide shaft 168; by the engagement of a bearing member 661 also carried by the right frame 654 with a guide shaft 662; and by the engagement with a shaft 663 of suitable right and left bearing members carried by a boxlike structure 666 (see Fig. 16), the latter being rigidly secured to the previously mentioned right and left frame members 654 and 655.

The shafts 662 and 663 are rigidly supported by the previously mentioned right and left end frames 114 and 116. The shaft 168 differs from its associated shafts 662 and 663 in that it contains a spline (Figs. 5 and 16) extending most of its length and is rotatably supported by suitable bearing inserts carried by the right end frame 114 and left end frame 116. It wil be recalled that the main drive shaft 134 through the gear 166 secured thereto and a meshing gear 167 secured to the shaft 168, continuously rotates the latter when the accounting machine is in operation. The timing relationship between the shafts 134 and 168 is such that one revolution of the shaft 168 is effected for every four revolutions or so-called drum cycles of the shaft 134.

The hammer carriage 652 and the print element carriage 570 are advanced in synchronism so that the hammer 649 and the print element 591 are always aligned with each other. The carriages are advanced through a common driving mechanism, to be explained, which, in turn, is driven from the previously mentioned emitter shaft 299. It will be recalled from the discussion of Fig. 4 that the emitter shaft 299 is driven from the drum shaft 134, through shaft 184, by engaging the gear 296 with the gear 298 of the shaft 299. The timing of the main drive shaft 134, and the emitter shaft 229 and its associated carriage advancing mechanism, is such that for each columnar advance of the print carriage 570, the drum 136 makes two complete revolutions (called one drum cycle).

Referring now to Fig. 17, it will be noted that slidably mounted on the shaft 168 and confined between the end frames 654 and 655 (Fig. 5) of the hammer carriage 652 so that it is advanced therewith, is a collar 667 to which a so-called hammer cam 668 and a hammer rebound cam 670 are secured. The collar 667 has inwardly projecting portions 667A which engage the splines of the shaft 168 thus "locking" the collar 667 and its associated cams to the shaft 168 for rotational movement therewith, without restricting the longitudinal movement of the carriage 652 and collar 667 on the shafts 168, 662 and 663. The cam 668 contains two high dwell positions spaced 180° apart or ½ revolution apart relative to their driving shaft 168, this spacing being equivalent to two drum cycles of the shaft 136 as indicated in Fig. 11. The cam 670 also contains two high dwells spaced two drum cycles apart.

Referring again to Fig. 17, the hammer element 651 is secured to a shaft 671 which is supported near each of its ends in upwardly extending forked positions 672 of a lever 673, the latter being pivotally mounted at its lower end on a shaft 675 which extends between the end frames 654 and 655 of the hammer carriage 652. Movement of the shaft 671 and integral hammer 649 in a vertical direction out of the supporting forked portions of the lever 673, is prevented by the engagement of each end of the shaft 671 with a horizontally extending groove in a related member 677 (Figs. 5 and 16) secured to the adjacent end frame 654 or 655. The lever 673 is continuously urged clockwise in Fig. 17, by a spring 678 connected therefrom to stationary carriage structure, so as to tend to engage a follower portion 680 of the lever 673 with the hammer cam 668. The lever 673 is normally latched, however, in a manner to be explained so as to prevent the engagement of the follower portion 680 with the cam 668.

Operation of the hammer 649 is effected under the control of a so-called hammer magnet 681 (see Fig. 7) which is secured to the inner surface of the left end frame 114. With the magnet 681 unenergized, the one end of the associated armature 682 thereof engages the one arm of a follower 683 which is pivotally mounted on the shaft 662 and is continually biased clockwise in Fig. 7 by a spring 685 extending therefrom to a fixed structure. As a result, the follower 683 is latched in the position shown in Fig. 7 against the action of its associated spring 685 and with a roller 686 carried by the follower 683 unable to follow various low dwells of an associated cam 687 (see Fig. 11), the latter being secured to the previously mentioned drum driven shaft 168. The one end of a flexible wire 688 is secured to a pin 690 carried by the follower 683 and extends from the follower 683, over a guide pulley 691 carried by the frame 114, over a guide pulley 692 (Fig. 5) carried on a frame member 693 secured to member 656 of the hammer carriage 652, over a pulley 695 (Figs. 5 and 17) carried on the one end of a hammer latch lever 695A, over a guide pulley 696 also carried by the frame member 693 of the hammer carriage, and finally to a stud 697 to which it is secured, the stud 697 being carried by the right frame member 116.

Upon an impulsing of the hammer magnet 681, in a manner to be explained, the resultant attraction of its armature 682 releases the follower 683 which then rotates counterclockwise in Fig. 7 under the urging of associated spring 685, this action permitting the roller 686 of the follower to freely follow the contour of the related cam 687. The clockwise movement of the follower 683 also displaces the associated wire 688 longitudinally towards the left frame member 114 in Fig. 5. Since the other end of the wire is fixed to frame 116, the longitudinal movement of the wire 698 forces the pulley 695 in a direction toward the associated fixed pulleys 692 and 696 on the hammer carriage, this action rocking the associated hammer latch lever 695A clockwise in Fig. 17 on a supporting pivot shaft 698 carried by the frame 654 and finally into engagement with an abutment member 700 secured to the lower portion of the U shaped member 657. As the latch lever 696 rocks clockwise, a laterally extending ear 701 thereof engages the underside of a hammer latch 702 and rocks it clockwise in Fig. 17 on the supporting pivot shaft 698, the rocking action of hammer latch 702 taking place against the action of an associated spring 705 connected therefrom to the member 657. As the latch 702 rocks clockwise, a nose portion 706 thereof is rotated free of engagement with a cooperating latch portion 707 of the lever 673, thus releasing the latter. The lever 673 is accordingly free to rotate clockwise in Fig. 17 under the urging of its associated spring 678 until the follower portion 680 thereof engages the hammer cam 668. The lever 673 continues to rotate clockwise as a succeeding lower dwell portion of cam 668 is rotated into engagement therewith. Finally, as a high dwell of the cam is presented to the lever 673, the lever is rotated counterclockwise in Fig. 17 against the action of its associated spring 678. The lever is rocked counterclockwise with sufficient velocity to move the follower portion thereof clear of the cam 668 and forcibly impels the hammer 651 and interposed print record 599 (Fig. 5) and inked ribbon 585 against the selected type character of the print element 591, thus effecting a printing operation.

As a printing operation is being effected, the follower 683 is rocked counterclockwise on its pivot shaft 662 by a related dwell of cam 687 (see Fig. 11) thus relatching the follower 683 on the restored armature 682 of the now unenergized magnet 681. As the follower 683 is relatched, the resultant longitudinal movement of the wire 688 releases the tension on the pulley 695 so that the associated latch lever 696 is restored counterclockwise in Fig. 17 under the urging of a related spring 708 connected therefrom to member 657 and into its "latch" position shown in Fig. 17. As the hammer lever 673 restores clockwise in Fig. 17, after the print operation, the hammer latch 702 drops behind the latch portion 707 of the lever 673 and into engagement with the ear 701 of the latch lever 696, and the mechanism is in condition for the next desired print operation.

Referring still to Fig. 17, it will be noted that pivotally mounted on pivot 675 carried by the right frame 654 of the hammer carriage 652 is a so-called hammer rebound damper lever 711. The lever 711 is tensioned counterclockwise in Fig. 17 by a spring 712 connected therefrom to the member 711 so as to maintain a follower portion 713 thereof in engagement with the previously mentioned cam 670. The contour of the cam 670 is such that the lever 711 is rotated so as to position a finger 715 thereof in a path to intercept the hammer lever 673 if, during the relatching of the hammer lever after a print operation, the lever rebounds from the latch 702. This rebound damping action insures against "double" printing. During the actual machine time, when a printing operation is possible, the lever 711 is positioned with the finger 715 thereof clear of the printing path of the hammer lever 673.

*Print device—The compensating carriage*

The print device also includes a so-called compensating carriage which is generally designated 716 on Fig. 5. The compensating carriage comprises an L shaped frame member 717 having upwardly extending portions

718 and 720 to which a horizontally extending plate 721 (see Fig. 1) is secured. In the cavity formed between the under surface of the plate 721 and the frame member 717 (Fig. 18), are arranged four pulleys 722, 723, 725 and 726, the supporting shaft for each pulley being rigidly supported at its ends by the plate 721 and frame 717. The carriage 716 is slidably mounted for movement in a path parallel to the type carriage 570 and hammer carriage 652 by the engagement of suitable bearing members 727 (see Fig. 5) carried by the frame 717 with guide shaft 590 and the engagement of a bearing member 728, also carried by the frame 717, with guide shaft 589. The purpose of the compensating carriage 716 and the pulleys 722, 723, 725 and 726 thereof, will be later explained.

*Print device—The carriage advancing mechanism*

For advancing the carriages 570, 652 and 716, there is provided a laterally flexible tape 730 which is secured at its one end to a pulley 731 (see Figs. 19 and 1), the latter being secured to the previously mentioned emitter shaft 299. The tape 730 extends from the pulley 731 over a pulley 732 carried in the lower end of an arm 733 which is pivoted at its upper end to fixed structure 735 carried by frame 116, over a pulley 736 pivotally mounted on an extension of frame 116, and then to the hammer carriage 652 (Fig. 5) to which it is secured. The tape 730 continues from the hammer carriage 652 over a pulley 737 (see Fig. 7) pivotally mounted on left frame 114, over a pulley 738 (Fig. 5) pivotally mounted on the right frame 116, over a pulley 740, also pivotally mounted on the right frame 116, and then to the print element carriage 570 to which it is secured. What may be considered as an extension of the tape 730, and will accordingly be referred to as 730A, extends from the print carriage 572, over the pulley 723 of the compensating carriage 716, over the pulley 722 of the compensating carriage, and finally to the right frame 116 to which it is secured.

A carriage restoring tape 741 (Fig. 5) having one end secured to the carriage 716 and its other end linked to a spring type wind-up mechanism 742 which is secured to the left frame 114, continuously biases the carriage 716 in a direction towards the left frame member 114.

It will be appreciated that the restoring tension of the spring 741 on the carriage 716, is reflected through the pulleys 722 and 723 carried on the carriage 716, and through the tapes 730A and 730 to the carriages 570 and 652, so as to also urge these carriages toward the left frame member and to maintain the various tapes taut. In Fig. 5 the carriages are shown in their extreme leftward or "home" position.

It will be recalled that the first tape guiding pulley 732 (Fig. 19) engaged by the tape 730 as it passes from the pulley 731, is carried on a pivoted arm 733. A link 743 has its one end pivotally connected to the arm 733 at a point above the pulley 732 thereof. The link 743 is pivotally connected at a point between its ends to the lower end of a supporting arm 745, the latter being pivotally supported at its upper end on a member 746 which is secured to the right frame 103. The other end of the link 743 carries a roller 747 adapted for cooperation with a cam 748 secured to the emitter shaft 299. With the shaft 299 disengaged, a high dwell of the cam 748 engages the roller 747 so as to position the associated mechanism as indicated in Fig. 19. With the shaft 299 engaged, the initial rotation thereof not only starts to wind the tape on the pulley 731, but also presents a progressive lower dwell portion of the cam 748 to the roller 747. As a result, under the urging of the tension of the tape 730 on the pulley 731, the entire structure comprised of the arm 733 and its pulley 731, the link 743, and the arm 745, shift in a direction toward the emitter shaft 299 to maintain the roller 747 in contact with the cam 748. This shifting action continues until an extending lip 750 of the arm 733 engages a fixed abutment 751, this abutting action taking place as the lowest dwell portion of the cam 748 rotates clear of the roller 747.

It will be appreciated that the counterclockwise rotation of the arm 733 and its pulley 731 during the above described action, in effect lengthens the tape during its initial lengthwise movement. As a result, the tapes 730 and 730A and the carriages 652, 570 and 716, are accelerated gradually from their "home" position in comparison to the almost instantaneous acceleration of the shaft 299 as it is engaged. The gradual acceleration of the tapes and the various carriages prevents possible damage thereto. Once the arm 733 engages the abutment 751, the longitudinal movement of the tape 730 as it winds on the pulley 731 is fully effective for advancing the carriages on their respective guide shafts. It will be evident upon an examination of Fig. 5 that the tape connection between the carriages 652 and 570 is such that these carriages are maintained continuously aligned as they advance. The advancing of the carriages 652 and 570 by the winding of the tape 730 on the pulley 731 may continue until the carriages have been advanced through a maximum of 80 columnar print positions from their so-called "home" positions. The timing betwen the emitter shaft 299 and the previously mentioned drum shaft 134 is such that for each columnar advance of the print carriage 570, the drum 136 makes two complete revolutions.

It will be recalled that the tape 730A which is considered as an extension of the tape 730 through which the carriages 652 and 570 are advanced, extends from the print carriage 570 over the pulleys 722 and 723 of the compensating carriage 716, and finally to the right frame 116 to which it is secured. It will be noted in Fig. 5 that this arrangement of the tape 730A is such that it actually forms a loop having two parallel spaced portions extending from the pulley 723 to the carriage 570 and the other portion extending from the pulley 722 to the frame 116. By reason of this loop arrangement of the tape 730A it is obvious that as the print carriage 572 is advanced, the associated movement of the tape 730A is effective to advance the carriage 716 at only ½ the rate of advance of the print carriage. The reason for advancing the carriage 716 at only ½ the rate of the carriages 570 and 652 will be later evident.

*The print device-type character selection mechanism*

It will be recalled that during the advance of the carriage 570 and associated print element 591 into each desired print column of the record 599, the actual character to be printed therein of the 47 possible characters on the print element, is selected by the combined actions of shifting the print element horizontally on the shaft 592 from 0 to 6 band positions through a corresponding movement of member 596, and rotating the print element 591 from 0 to 7 angular movements through a corresponding rotational movement of the supporting shaft 592. This type selection operation positions the print element relative to the carriage 570 so as to move the selected type character into the position occupied by the blank home type area when the print element is in its so-called "home" position. The type character selection operation is effected under the control of the previously mentioned set-up mechanism 600 which is explained in detail hereinafter. The set-up mechanism 600 is arranged on vertically extending support plates 752 and 753 (see Fig. 8), the plate 752 being rigidly secured at its left end in Fig. 6, to a member 755 and at its right end to a member 756, the members 755 and 756 being rigidly secured in turn to the left end frame 114 and right end frame 116, respectively. The plate 753 is rigidly spaced from and parallel to the plate 752 by spacers 757.

*The print device-type character selection (the rotary positioning mechanism)*

Referring now to Figs. 5, 20A and 20B, it will be recalled that the shaft 592 on which the print element 591 is supported is rotatably supported by suitable bearing inserts carried by end plates 571 and 572 of the carriage 570. Secured to a portion of the shaft 592 which extends beyond the plate 571 is a gear 758 (Fig. 20A) which meshes with a gear-like member 760 integral with a pulley 761. It will be noted that the member 760 contains two spaced groups of teeth 762 and 763 cut in the periphery thereof, the one group 762 being meshed by the gear 758. The purpose of the other group of teeth 763 will be later evident. The pulley 761 is rotatably supported on a shaft 765 which is supported by the end frame 571 and a plate 766, the plate 766 being rigidly spaced from the frame 571 by spacers 767 and 768. A lever (not shown) is pivotally mounted at one end to an extending arm (not shown) of plate 766, in a position aligned with the pulley 761. The lever is tensioned by a spring (not shown) extending therefrom to an arm (not shown) which is rigidly secured to the end frame 571.

A cable 775 is secured to the free end of the lever and extends therefrom to a point on the periphery of the pulley 761 to which it is secured. The tension of the spring tensioned lever acting through pulley 761, the integral gear 760 thereof, and the meshing gear 758 carried by shaft 592, continuously biases the print element 591 towards its "home" angular position. The rotational type selection movement is applied to the shaft 592 against the bias of the spring tensioned lever (not shown) through a so-called rotational set-up cable 776, the one end of which is also secured to a point on the periphery of the pulley 761. The cable 776 extends from the pulley 761, over a pulley 777 (Fig. 5) rotatably supported on the left frame 571, over the pulley 725 carried by the compensating carriage 716, through a clearance opening 778 on the left frame 571 of the carriage, through an aligned clearance opening in the right frame 572 of the carriage, over a pulley 780 which is rotatably supported on a member 781, the latter rigidly secured to the right end frame 116, over a pulley 782 rotatably supported on the plates 752 and 753 (see Fig. 8), over a pulley 783 carried on the one end of a lever 785 which is pivotally supported at 786 on the rear of plate 752, over a pulley 787 carried by a lever 788 which is pivoted at 790 on the rear of plate 752, and finally to the one arm of a lever 791 to which it is secured, the lever 791 being pivoted at 792 on the rear of the plate 753.

The levers 785, 788 and 791 are all spring biased in a clockwise direction in Fig. 8 and may be rocked singly or in counterclockwise direction, in a manner to be later explained. The parts are so proportioned that if the lever 785 is rocked alone, the resultant displacement of the cable 778 is effective through the pulley 776 etc. to rotate the print element four angular increments from its "home" position. Similarly, if lever 788 is rocked alone, the print element is rotated 2 angular increments from its "home" position, while if lever 791 is rocked alone, the print element is rotated 1 angular increment from its "home" position. It is thus evident that by actuating the levers 785, 788 and 791, singly and in combination, as indicated to the right of the print element development view in Fig. 13, the print element 591 may be displaced angularly from 1 to 7 positions from its home position to present the corresponding "line" of type thereon to the print line. It will be particularly noted that the path of the cable 776 between the print element of the movable carriage 570 and the set-up mechanism 600 arranged on stationary structure, includes an operational engagement with the pulley 725 of the compensating carriage 716. Recalling that the carriage 716 advances at only ½ of the rate of the carriage 570, it is evident that the carriage 716, in effect, continuously compensates for the position of the carriage 570 so that the cable 776 is always taut and so that any actuation of the levers 785, 788 and 791 singly or in combination, and regardless of the columnar position of the carriage 570, effects an unvarying corresponding angular displacement of the print element 591.

The print mechanism includes a so-called rotary aligner 793 (Fig. 20A) which is secured to a shaft 795 rotatably supported by the end frames 571 and 572 of the carriage 570. Also secured to the shaft 795 is a follower 796 which is tensioned by a spring 797 so as to maintain it operatively engaged with an associated cam 798 carried by a shaft 800 which is rotatably supported by the end frames 571 and 572. The shaft 800 extends beyond the frame 572 and secured to this extending portion is a gear 801 (see Fig. 20B) which meshes with a gear 802, the latter being secured to the one end of the previously mentioned driven collar 615. The contour of the cam 798 is such (see Fig. 11) that each possible print cycle after the rotary type selection motion of the print element 591 is completed, the shaft 795 is rocked so as to engage the nose of the aligner 793 with an adjacent one of the teeth 793 of the gear 760. There are 8 notches in the group 763 of gear 760, one for each of the possible rotational positions thereof. The space between adjacent notches in the group 763 is equal to one rotational increment of the print element 591 and the particular notch engaged by the aligner 793, corresponds directly to the increment(s) of set-up rotation previously effected on the print element 591. The nose of the aligner 793 as it moves into engagement with the associated notch adjusts the rotational position of the print element so that it is "precisely" positioned in the desired rotational position, if it was not already so positioned as a result of the actual selection operation.

*Type character selection—the horizontal positioning mechanism*

Referring now to Fig. 18, it will be noted that the carriage structure 570 includes a pulley 803 which is secured to a shaft 805 rotatably supported by a frame 806 and a parallel frame 807 rigidly spaced therefrom by a member 804, the member 806 being rigidly secured to the right end frame 572 of the carriage 570. Also rotatably supported by the frames 806 and 807 is a shaft 808 to which is secured the one end of a lever 810. The lever 810 is secured to the shaft 808 in a position aligned with the pulley 803. It will be recalled from previous discussions that the print element 591 is displaced horizontally on its supporting shaft 592 through an equivalent motion of the member 596 on its guides 594 and 595. A cable 813 having one end secured to the right end (see Fig. 5) of member 596, extends therefrom over the pulley 803 to the free end of the lever 810 to which it is secured. The tension of the spring 811 (see Fig. 16) acting on lever is effective through the linkage traced above, to continuously bias the member 596 towards a position so as to engage the frame 572. When the member 596 is engaging the frame 572, the related print element 591 is positioned thereby into its so-called "home" horizontal position. The horizontal selection movement is applied to the member 596 against the action of spring 811 through a so-called horizontal set-up cable 815.

The cable 815 (see Fig. 18) has one end thereof secured to the left end of the member 596 and extends therefrom through a clearance opening in the left frame 571 of the carriage 570, over the pulley 726 of the compensating carriage 716, back through another clearance opening in the left frame 571 of the carriage 570, through an aligned opening in the right end frame 572 of the carriage 570, over a pulley 816 (Fig. 5) rotatably supported on the right frame 116, over a pulley 817 rotatably supported on the plates 752 and 753 (Fig. 8), over a pulley 818 carried on the one end of a lever 820 which is pivotally supported at 820 on the rear of the plate 752, over a pulley 821 carried by a lever 822 which is pivoted at 823 on the rear of plate 752 and finally to the one end of a lever 825 to which it is secured, the lever 825 being pivoted at 826 on the rear of the plate 752.

Figure 8:
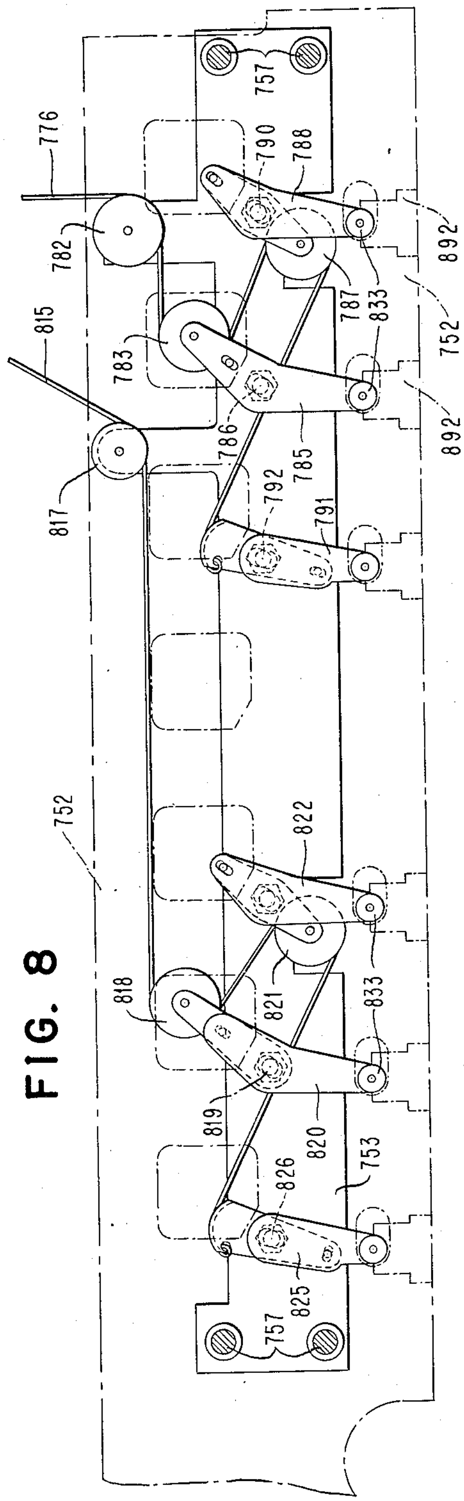
Fig. 8 is an elevation view of the back of the print device set-up mechanism.

The levers 820, 822, and 825 are all spring biased in a clockwise direction in Fig. 8 and may be rocked singly or in combination through the same angle in a counterclockwise direction, in a manner to be explained. The parts are so proportioned that if the lever 820 is rocked alone, the resultant displacement of the cable 815 is effective to displace the member 596 and, in turn, the print element 591, 3 horizontal increments from its so-called "home" position. Similarly, if lever 822 is rocked alone, the print element is displaced 2 horizontal increments from its "home" position, while if lever 825 is rocked alone, the print element is displaced 1 horizontal increment from its home position. It is thus evident that by actuating the levers 820, 822 and 825, singly and in combination, as indicated along the top of the development view in Fig. 13, the print element may be displaced horizontally from 1 to 6 increments to present the corresponding band of type therein to the print position. This selectable horizontal positioning of the print element, in combination with the selectable angular positioning thereof, as previously described, permits any one of the 47 possible type elements of the cylinders to be selected for printing, as indicated in Fig. 13.

It will also be particularly noted that for the same purpose as described previously for the rotational set-up cable 776, the path of the cable 815 between the print element 591 and the set-up mechanism 600, includes an operational engagement with the pulley 726 of the compensating carriage 716. As a result the cable 815 is always taut so that any actuation of the levers 820, 822 and 825, singly or in combination, and regardless of the columnar position of the carriage 570, effects an unvarying corresponding horizontal displacement of the print element 591.

The print mechanism includes a so-called horizontal aligner 827 (Figs. 5 and 20B) which has a series of notches 828 cut along the one edge thereof, one for each possible horizontal position of the cylinder. The space between adjacent notches 828 (Fig. 18) is equal to 1 increment of horizontal selective movement of the print element 591. The aligner is secured to a shaft 830 which is rotatably supported by the end frames 571 and 572 of the carriage 570. Also secured to the shaft 830 is a follower 831 which is spring tensioned so as to maintain it operatively engaged with an associated cam 832 carried by the previously mentioned driven shaft 800. The contour of the cam 832 is such (see Fig. 11) that each possible print cycle after the horizontal selection motion of the print element 591 is completed, the shaft 830 is rocked so as to engage one of the notches 828 of the aligner 827 with the edge of an end portion 597 of the member 596. The particular notch 828 engaged corresponds directly to the increment(s) of horizontal movement previously effected on the print element. The engagement of the aligner 827 with the member 596 "precisely" adjusts the horizontal position of the print element 591, if it was not already "precisely" positioned as a result of the actual horizontal selection operation.

Each of the 7 levers 785, 788, etc. may be selectively rocked through mechanism comprised of a related pin 833 rigidly secured to the lower extremity of the lever. Each pin 833 extends from its associated lever through an adjacent opening in the plate 752 and beyond the front surface of the plate (see Fig. 9). Pivotally supported on each of the pins 833 in front of the plate 752 are a pair of identical so-called feed pawls designated 835 and 836, and a locking pawl 837. The pawls are shown separately in Figs. 10A, 10B and 10C where it is seen that pawls 835 and 836 are slotted for sliding action on the associated pin 833, while pawl 837 is not slotted. Each of the pawls 835, 836 and 837 associated with a particular one of the levers 785, 788, etc. is guided for motion in a particular operational plane parallel to the plate 752 by its confinement in a corresponding slot of a comb-like member 838 (Fig. 6), the latter being rigidly secured to the plate 752. Each of the pawls is biased in a counterclockwise direction in Figs. 10A, 10B and 10C on its associated supporting pin 833 and simultaneously in a direction towards the left, by a related individual spring 840 connected therefrom to a spring stud 841 carried by the plate 752. An individual abutment 842 secured to the plate 752 limits the leftward movement of each group of 3 pawls 835, 836 and 837.

Pivotally supported on plate 752 above the right end of each group of 3 pawls is an associated detent 843 which is tensioned counterclockwise in Fig. 6 and Figs. 10A, 10B and 10C by a spring 845 connected therefrom to a fixed stud carried by the associated member 838. An abutment stud 846 carried by the plate 752 limits the extent to which the detent 843 can rotate clockwise in Fig. 10C. The spring 845 normally maintains the nose of the detent 843 engaged with a mating notch 847 in the right end (see Figs. 10A and 10B) of each of the related pawls 835 and 836, and a surface 848 of the pawl 837. The actual operational purpose of the detent 843 will be later evident.

The pawls 835 of the 7 levers 785, 788, etc. lie in a common plane with a slide 850 which is mounted for horizontal reciprocation on posts 851 carried by the plate 752. The slide 850 is biased toward the left in Fig. 6 by an associated spring 852 so as to maintain a roller 853 thereof in engagement with an operational cam 855. The cam 855 is secured to a shaft 856 which is rotatably supported by suitable bearing inserts carried in the plate 752 and a support plate 857 (see Fig. 7), the latter being rigidly secured to the plate 752. The shaft 856 is continuously rotated through a gear 858 secured thereto and a meshing gear 860 secured to previously mentioned shaft 174, the shaft 174 being rotatably supported by the end frames 114 and 116. There is a tooth 861 on slide 850 for each pawl 835 and as the shaft 856 rotates, the cam 855 reciprocates each slide 850 (see Fig. 11) so that each tooth 861 thereof oscillates below the related pawl 835. If a pawl 835 is rocked clockwise about its pin 833 into the position indicated in the next to the top illustration in Fig. 10A, the pawl 835 will be engaged by the related tooth 861 of slide 850 so as to forcibly rock the associated lever 785, 788, etc. through a predetermined angle.

The pawls 836 of the 7 levers also lie in a common plane with a slide 862 which is mounted in the same manner as slide 850 and is actuated by a cam 863 on shaft 856. Cam 863 has the same configuration as cam 855 but is mounted on the shaft 856 with a 180° displacement from cam 855, so that slides 850 and 862 are reciprocated oppositely. Slide 862 has a tooth 865 for each pawl 836 and, if one of these pawls is rocked clockwise as indicated in the lower illustration of Fig. 10B, it will be engaged by the related tooth 865 to rock that lever 785, etc. counterclockwise. It will be noted from Fig. 11 that the timing relationship between the shaft 174 and the drum shaft 136 is such that 1 revolution of shaft 136 is effected for every 4 drum cycles. With this timing relationship and by means of the 180° displacement of cam 855 from cam 863 on the shaft 174, it is evident that a type selection operation may be effected every 2 drum cycles.

Figure 9:
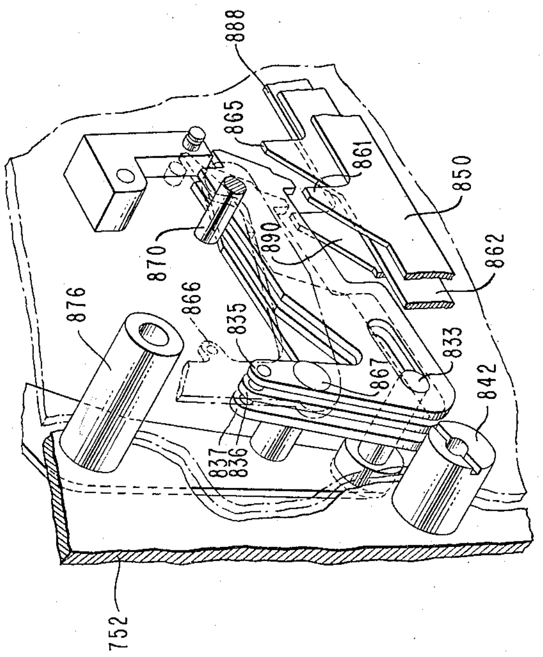
Fig. 9 is a perspective view of one of the print device set-up actuators.

The mechanism for rocking pawls 835, 836 and 837 comprises a lever 866 of which there is one provided for each of the 7 sets of pawls (see Fig. 6). Each lever 866 is pivoted at 867 to the front plate 752 and is biased clockwise by a spring 868 extending therefrom to the related comb member 838. A bail 870 (see Fig. 9) is secured to one arm 871 of each lever 866 and extends laterally therefrom into the plane of the corresponding pawls 835, 836 and 837. Secured to the plate 752 adjacent each of the levers 866 is an associated so-called print control magnet 872 having an armature 873 which, when the magnet is unenergized, is maintained by an armature return spring 875 connected therefrom to the related member 838, in a position engaging a related abutment 876 carried on the plate 752. With an armature 873 in this "unattracted" position, as shown in Fig. 6, the free end thereof abuts a latch surface of an arm 877 of the related lever 866 so as to latch that lever against the action of its associated spring 868. When a lever 866 is in this latched position, the associated bail 870 is positioned in a corresponding so-called "up" position clear of the top edge of the related pawls 835, 836 and 837 as represented in Fig. 9.

Figures 10A, 10B, 10C:
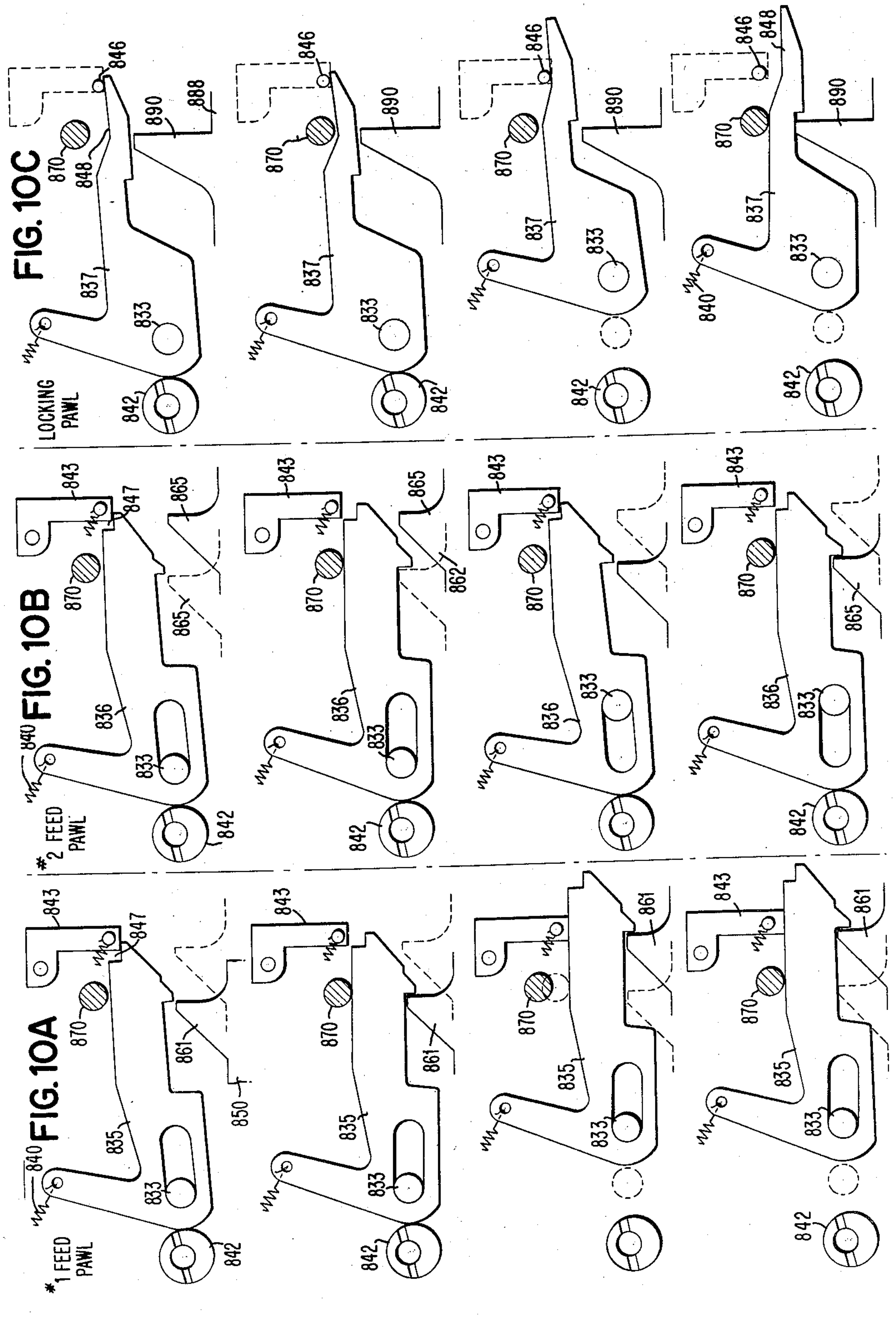
Figs. 10A, 10B and 10C show the print device set-up mechanism at various machine intervals in the operation thereof.

Upon the impulsing of a print magnet 872, the resultant attraction of its associated armature 873 releases the related lever 866 for clockwise rotation in Fig. 6. As a lever 866 rotates, the bail 870 thereof engages the top surface of the related pawls 835 and 836 to displace them clockwise on their pivot 833. This action positions the pawls 835 and 836 in the operational plane of the teeth 861 and 865 of their related slides 850 and 862, respectively, as indicated in the next to the top illustrations in Figs. 10A and 10B. It will be noted in Fig. 10A that the slide 850 is indicated as being in its extreme lefthand or restored position while the slide 862 in Fig. 10B is indicated as being in the corresponding extreme righthand or advanced position. It will also be noted that with the pawls 835 and 836 positioned as indicated, the notched end 847 of each is clear of operational engagement by the related detent 843.

With the pawls 835 and 836 rocked clockwise, the particular one of the slides 850 or 862 subsequently moving to the right (see Figs. 10A and 10B) or advancing at that time engages the related pawl 835 or 836 to operationally rock the associated lever 785, 788, etc. as previously described. For example, assuming an initial state of the slides, as shown in the next to the top illustration in Figs. 10A and 10B, the subsequent advance of the slide 850 as indicated in the next to the bottom illustration in Fig. 10A, carries the associated pawl 835 therewith to rock the corresponding lever 785, etc. As a pawl 835 is advanced by its slide 850, for example, the alternate pawl 836 remains in its extreme leftward position engaging the abutment 842 with the pin 833 of the rotating lever 785, etc. riding to the right in the slot of the pawl as indicated in the next to the bottom illustration in Fig. 10B.

It will be noted in Fig. 10A that the top surface of the pawl 835, for example, as it advances, rides under the end of the associated detent 845 which maintains it positively engaged with the advancing slide 850. As a result, shortly after the pawl 835, for example, starts to advance with its related slide 850, the associated lever 866 and integral bail 870 may be restored and latched in preparation for the next operation. As the bail 870 restores the alternate pawl, such as 836 for example, it follows the restoration movement of the bail from the position indicated in the next to the top illustration in Fig. 10B until the notched end 847 thereof again engages the detent 843 as indicated in the next to the bottom illustration in Fig. 10B.

When the advancing slide 850 and its associated pawl 835 reach their extreme advance position, as indicated in Fig. 10A, the alternate slide 862 is positioned in its extreme leftward or restored position. The mechanism is thus properly conditioned so that if the magnet 872 is impulsed at this time, the pawl 836 is engaged with and subsequently advanced by the associated slide 862 to actuate the lever 785, etc. The firing of the hammer 649 to physically effect the actual printing of a selected character is effected when the selected levers 785, etc. and their actuating slide 850 or 862 reach their extreme advanced or right-hand position in Fig. 6. It will be noted in Fig. 11 that, at this time, the horizontal and vertical aligners 793 and 827 are engaged so as to accurately lock the print element 591 in the selected position.

For restoring and relatching the levers 866, there is provided a semi-rigid elongated bail 878 which extends through an aligned clearance opening in the arm 877 of each lever 866. The left end of the bail 878 is pivotally connected to a follower 880, the latter being pivotally mounted at 881 on the plate 752 and carrying a roller 882 on one arm thereof for cooperation with a cam 883 secured to the shaft 856. A spring 885 linking the right end (see Fig. 6) of the bail 878 to a stud 886 carried by the plate 752, tensions the bail 878 towards the right in Fig. 6 so as to maintain the associated follower 880 continuously engaged with the cam 883. The cam 883 contains two equally spaced operational dwells, as indicated in Fig. 11, for reciprocating the bail 878 twice during each revolution of the shaft 856, once for every two drum cycles, it being recalled that one revolution of the shaft 856 is effected every 4 drum cycles. Secured to the bail 878 near the arm 877 of each lever 866 is a related relatching member 887. The arrangement of the members 887 on the bail 878 and the timing of the cam 883 to the print operation is such that during the interval when the print magnets 872 may be selectively impulsed to release the related levers 866, in the manner previously explained, the bail 878 is positioned so that each of the associated latch members 887 will not interfere with the possible operational rocking of its related lever 866. As a slide 850 or 862 starts to move to the right to actuate the levers 785, 788, etc. of the particular print magnets previously impulsed, the bail 878 moves toward the left in Fig. 6 with the relatch member of each "released" lever acting upon the arm 877 of the "released" lever 866 to relatch that lever on the armature 813 of the associated, then unenergized, control magnet 872.

The relatch action of the levers 866 is completed at approximately the same time as the advancing slide reaches its extreme right-hand position and the alternate slide reaches its extreme left-hand position in Fig. 6. Thereafter, the print magnets 872 may again be selectively impulsed in accordance with the next desired print character, to rock a new set of pawls accordingly for advance by the alternate slide, while those pawls previously advanced return as the first slide moves to the left (see Fig. 6). Provision is made so that where a selected and actuated lever 866 is again selected by the reimpulsing of the corresponding control magnet 872 for the next desired type selection operation, such lever 866 is not restored but is caused to remain in the actuated position. For this purpose a bar 888 (see Figs. 6, 9 and 10C) is provided which is fixedly mounted on posts 851 and has teeth 890 lying in the plane of movement of the latching pawls 837. When a lever 866 is in its latched positions, with both the associated pawls 835 and 836 being in the corresponding restored positions, as shown in the top illustrations of Figs. 10A and 10B, the associated latching pawl 837 is positioned as shown in Fig. 10C with the recessed portion 848 on the top surface thereof being underneath the bail 870. Upon an impulsing of a magnet 872, the resulting rocking of the lever 866 and its associated bail 870 rocks the related pawls 835 and 836 on their levers 785 etc. into the operational plane of the slides 850 and 862, respectively, as previously described. This rocking of the bail 870 does not affect the rotational position of the associated latching pawl 837 on that lever 785, etc., however, since by reason of the recess 849 in the pawl 837, the bail 870 even when in its maximum "downward" position is still clear of the pawl as indicated in the next to the top illustration of Fig. 10C.

During the subsequent advance of either pawl 835 or 836 by the associated slide 850 or 862, respectively, as the case may be, the corresponding motion of the lever 785, etc. advances its latch pawl 837 into the position indicated in the next to the bottom illustration of Fig.

10C wherein a raised shoulder 891 will lie beneath the bail 870. If now the same actuated lever 785, etc. is to be selected for the next desired print selection operation, i.e., in the next ½ revolution of shaft 856, the related lever 866 and its bail 870 will be actuated with pawl 837 in the position of Fig. 10C (next to bottom illustration) and the pawl will be tilted to position it in the plane of the adjacent tooth 890 of the bar 888. This latching rotation of the pawl 837 takes place as the advancing slide 850 or 862 and the associated lever 785, etc. reach their extreme right-hand position, at which time the hammer 651 fires to effect the actual print operation.

With the pawl 837 rotated and the lever 785, etc. in its right-hand position, there is a slight clearance between the tooth 890 of the adjacent bar 888 and the pawl 837, as indicated in Fig. 10C (lower illustration). Thereafter the initial part of the restoring motion of the advanced slide 850 or 862 as the case may be, and the corresponding movement of lever 785, etc., closes the above clearance so that the latch pawl 837 tightly engages the related tooth 890 of the bar 888. This engagement arrests further movement of the lever 785, etc. towards its restored position but does not impede the further restoration of the pawl 835 or 836. With the pawl 837 engaged with the related tooth 890 of the bar 888, and with the continued movement of the previously advanced pawl 835 or 836 toward its restored position, the spring tension applied from the particular set-up cable through the latched lever 785, etc. is fully effective to maintain the pawl 837 latched on the bar 890. This tension is sufficient to overcome the tension of the related spring 840 tending to unlatch the pawl 837, as the lever 866 and bail 870 restore in their normal manner. A slight undercutting of the latching surface of the pawl 837 also serves to assist the maintenance of the latched pawl relationship until the newly advanced pawl 835 or 836 picks up the particular latched lever 785, etc. to again overthrow it by the previously mentioned clearance motion.

With the lever 785, etc. again in its extreme right-hand position, the actual printing operation is effected as described before. If the latched lever 785, etc was not selected again so that at the time of the latter print operation, the bail 870 is in its "up" position, the clearance between the previously latched pawl 837 and the tooth 890 of the bar 888 permits the tension of associated spring 840 to be effective to rotate the hook clockwise on lever 785, etc. to a position clear of the related tooth 890. Thereafter, as the advanced slide 850 or 862 restores towards the left, the associated lever 785, etc. and latch pawl 837 restore therewith to their inoperative positions.

The net effect of this latching action is to obviate the return of the print element 591 to home position between successive printing operations, and, where the same type character is to be printed in successive columns, the print element will be positioned for the first such print operation and then held in such position for the desired repeated printing therefrom.

Obviously, where the next print character lies in the same "band" or "line" of the print element, that "line" or "band" will have its selecting connections latched so that the print element is simply repositioned along the previously selected "band" or "line" to the new character therein. To be more specific, if (see Fig. 13) the letter A is first selected, the cylinder is shifted horizontally 3 band positions and rotated 6 angular positions from the home position as previously explained. If the next character selected is the letter I, the carrier remains in its rotational position but shifts 2 bands further to the left.

By providing alternately operating slides 850 and 862, high speed of operation is obtained since while one slide is effecting a selection, the other is being restored. By providing further a latching mechanism so that the restoration of levers required in the next selection is obviated, the extent of movement of the print element is only that required to move directly from one character to the next without an intervening homing action. Due to the high print speed so obtainable, the advance of the carriage 570 across the columns of the print record 599 is continuous with the associated print element 591 accordingly being in motion when the hammer 651 is impelled against each particular desired print character.

Each of the print control magnets 872 of which there are six in all is assigned a particular one of the bit codings Z1, Z2, 1, 2, 4, 8 of a combinational code. The print magnets 872 coded 4, Z1 and Z2 control, respectively, the operation of the levers 791, 788 and 785 associated with the "rotational" set-up cable 776, while the print control magnets coded 2, 8 and 1 control, respectively, the operation of the levers 825, 822 and 820 associated with the "horizontal" set-up cable 815. The particular horizontal or rotational motion imparted to the print element 591 as a result of the energization of any selected one or ones of the controlling print magnets 872 is summarized in the table below:

Print magnet:
- Z1 imparts 2 units of rotation to print element
- Z2 imparts 4 units of rotation to print element
- 4 imparts 1 unit of rotation to print element
- 1 imparts 3 units of horizontal motion to print element
- 2 imparts 1 unit of horizontal motion to print element
- 8 imparts 2 units of horizontal motion to print element For example, to position the print element to print the letter A, as described previously, the Z1, Z2 and 1 print magnets are energized. It will be recalled that the 6 bit binary coding for the letter A is a binary one in the zone 1, zone 2, and "1" binary bit positions. The energization of the "1" print magnet effects an actuation of lever 820 and the associated pulley 818. This action accordingly displaces the print element 591, 3 units to the left in Fig. 5 from its home horizontal position. The energization of zone 1 and zone 2 print magnets effects an actuation of the respective lever 788 and associated pulley 787, and lever 785 and associated pulley 783. This action accordingly rotates the type cylinder 6 units from its home angular position. As a result of 3 units of horizontal movement and 6 units of angular movement, the desired type letter A is in printing position at the printing line. The conversion table in Fig. 15 summarizes the manner in which any one of the possible 26 letters, 10 numbers, and 10 special characters of the combinational code (6 bit) is translated into the proper horizontal and angular shifting of the type cylinder to position the desired letter at the printing position of the particular column of the record in which the carriage is then positioned. In the particular embodiment of the printer illustrated, the combinationally coded signals for effecting related character printing, are stored in a serial by character and parallel by bit position in the previously mentioned magnetic storage drum.

In order to select the desired characters from the storage drum tracks to be printed there must be provided some means of addressing the drum and also correlating the selected address to the desired columnar print position of the printing apparatus.

The addressing means for the drum may include a so-called electronic addressing device of a type well known to those versed in the art, the addressing device being driven by impulses generated by the passage of magnetized teeth of the previously mentioned so-called clock track of the magnetic drum past a magnetic reading head and, thus, always representative of the angular position of the drum or, in actuality, the address of a related storage slot of the drum passing under a related "read" head at that time. Each successive position of the address device, as energized, emits a corresponding impulse or gate impulse from a corresponding output hub on the pluggable control panel 124.

The columnar print position of the carriage is always represented by the previously mentioned so-called print position control exit emitter 363 which is driven by shaft 299 and is synchronized with the advancing of the carriage as previously described. Each position of the print position control exit emitter terminates at a plughub on the control panel 127 and an impulse is emitted therefrom during the interval that the print element is in the corresponding columnar print position. It is thus evident that by properly plugwiring a gate output pulse from the drum address means through a desired print columnar representative position of the print position emitter 363, an output gate pulse may be generated at a particular time properly relating the drum position (address) and the print device columnar position. This output gate may be utilized as a gate pulse for activating the "read head" of the drum to read out the corresponding 6 bit combinationally coded character signal to the print control magnets 872 to initiate a printing operation. Thus during the column by column advance of the print carriage across a print line of the print record, the determination as to which columns have printing effected therein, and the character position of the drum from which this print information is obtained, is selectively predetermined by appropriate plugboard wiring on the control panel 127. In actuality the print position emitter segments corresponding to any particular columnar print position are activated at a time which actually leads the corresponding columnar position of the print carriage in machine time by approximately 4 drum cycles. For example during an actual drum cycle in which an address drum track data is actually read out in reference to a desired print operation in column 40 of the print record, for example, the print carriage is not physically in column 40, but in column 38 and may be effecting a printing operation therein of coded signal information that was directed thereto four drum cycles previously mentioned thereto.

The four drum cycle "lead" of the print selection initiating impulse to the actual corresponding print operation is comprised of two drum cycles in which to set up the proper circuitry as a result of the print initiating (address pulse) pulse, and two more drum cycles to actually set up the print mechanism in correspondence to the state of the set-up circuitry at the end of the initial two drum cycles. During the 2 drum cycles of the actual mechanical selection of the desired type character, the print set-up circuitry is free to be adjusted for the selection of the next type character. This overlapping of mechanical selection of the desired print character and the adjustment of the set-up circuitry for the next print character selection permits printing to be effected at the previously mentioned rate of one print column per two drum cycles, even though the complete circuit set-up and mechanical set-up for printing any particular column actually requires four drum cycles. To effect an actual character print operation in a desired column it is also required that the controlling magnet 681 of the hammer mechanism be impulsed at the proper time so that the print hammer strikes at approximately at mid point of the actual drum cycle in which the printing takes place (see Fig. 11). In the particular application of the print device illustrated, this proper timing is obtained by an appropriate circuit, an operation of which is initiated at the proper time in response to the same print position central exit emitter and address device interaction by which the selected address drum data is applied to the print control magnets.

*The line stop operation*

Upon the completion of the printing operation in the last desired column of the print line, a so-called line stop magnet 921 (Fig. 4) is energized, in a manner to be explained. The energization of magnet 921 attracts its armature 922 (Fig. 4) which effects a corresponding displacement of a pivoted lever 923, against the bias of an associated spring. As the lever 923 rotates, a roller 925 carried thereon acts against the collar 293 of gear 294, and accordingly displaces the gear 294 on its supporting shaft 296 so as to disengage it from the gear 298. With the gear 294 disengaged, the spring wind-up 742 (Fig. 5) through the tape 741 restores the carriages 570, 652 and 716 to their respective "home" positions. The restoring motion of the carriages is effective, in turn, through the tape 730 and pulley 731, to restore the emitter shaft 299 and associated emitter 363 to its corresponding "home" position.

It will be recalled that the print position emitter 363 is at all times representative of the print carriage position, consequently, the position of this emitter following the last desired print column may be utilized as an impulse source to energize the line stop magnet 921 and terminate that machine cycle. For example, if print column 68 is the last column in which entry record data is to be printed, the 69th print position control exit hub of the emitter 363 is connected through a plugwire to a so-called line stop hub. When the print position control emitter 363 reaches its 69th position, a circuit is completed therethrough to the line stop hub and then to the line stop magnet 921 to energize it and effect carriage return as described above. If the carriage return is not initiated by plugboard control at some column before the 80th or last possible print column of the printing apparatus, the line stop magnet 921 is automatically energized to initiate carriage return after the printing operation is completed in the 80th column.

*The print record feeding and guiding mechanisms*

The print record 599 is of the continuous form type which is divided by lines of laterally extending scoring perforations at fixed intervals along its length, into a series of individual records. The scoring perforations permit one or any multiple of the individual records to be ripped from the continuous form and removed from the print device after a printing operation is completed thereupon. The print record is folded back on itself at each line of scoring perforations so as to form a stack in a suitable supply carton, the record being fed directly from the carton, between guide plates 930 and 931 (Fig. 7) which are secured to the end frames 114 and 116, between the print carriage 570 movement path and hammer carriage 652 movement path, and into operative engagement with a print record advancing or line spacing apparatus, generally designated 931 in Fig. 6, and finally over a fixed guide member 932 carried by the stationary shaft 118, from which the record is discharged from the printing device.

Referring to Fig. 6, the print record advancing mechanism 931 comprises identical left and right frame members 933 which are secured to fixed shaft 935, the latter being supported by the left frame member 114 and right frame member 116 (Fig. 5). Secured to the upper end of each member 933 is a related shaft 936 on which is rotatably mounted an associated sprocket 937. A shaft 938 which is rotatably supported by the end frames 114 and 116, extends through suitable bearing inserts in the members 933. Vertically aligned with each of the sprockets 937 and secured to the shaft 938 for rotation therewith adjacent each of the members 933 is a related sprocket 940 (Fig. 6). Each pair of aligned sprockets 937 and 940 is operatively engaged by an associated endless chain 941. Secured to the usual connecting members 942 between each link of chain 941 is an ear 943, which extends laterally beyond the one side of the chain 941 and overlies but does not engage the associated frame member 933. A pin 945 is secured to this extending portion of each ear, the pin extending outwardly therefrom in a direction away from the frame 933. The pins 945 of each chain thus form an endless loop in a plane parallel to the links of that chain 941.

Secured to and extending between the frame members 933 is a member 946 having a plane record supporting portion 946A. That portion of the record between the member 946 and the support guides 930 and 931 is supported by suitable rollers 947 which are secured to the shaft 938. The pins 945 on the forward portion of each related loop in Fig. 6 extend through mating openings along a related edge of the record 599. Secured to the outer surface of each frame 933 is a plate member 948. Hingedly mounted on each member 948 is a member 950 which is tensioned by a spring 951 connected therefrom to the member 948. With each member 950 in the position shown in Fig. 6, a plane portion 950A thereof bears against the forward surface of the record 599 to maintain the openings in the adjacent edge of the record engaged with the pin 945. It will be noted that the pin 945 with each edge of the record 599 extend therethrough and into an aligned slot 950B in the associated member 950.

It is evident from the above described mechanism that any clockwise advance of the shaft 938 in Fig. 7 effects, through each of the sprockets 940, a corresponding movement of the related chain 951, the motion of the chain being effective, in turn, through the related pins 945 engaged with the record 599 to advance the record upwardly in Fig. 6. Mechanism to be described hereinafter, is provided for selectively advancing the shaft 938 in angular increments so as to effect line spacing of the print record, as required. When it is desired to insert a fresh continuous record form in the print device or to remove the form from the print device, the hinged members 950 may be manually rotated clear of engagement with the record 599 so that it may be freely removed from engagement with the related pins 945.

*The line space mechanism*

The mechanism for advancing the shaft 938 comprises a 3 armed lever 952 which is pivotally mounted on the shaft 662 as shown in Figs. 7 and 21. Operationally associated with the lever 952 is a so-called line space control magnet 953 which is mounted adjacent the previously mentioned hammer control magnet 681 and is similar thereto. With the magnet 953 unenergized, the end of the associated unattracted armature thereof abuts a latch surface on the one arm 955 of lever 952. As a result, the lever 952 is "latched" against rotation in a counterclockwise direction in Fig. 7 under the urging of associated tensioning spring 956, the latter being connected from the arm 955 to stationary frame structure of the magnet 953. With the lever 952 latched, a roller 957 on a second arm 958 thereof is maintained free of operational engagement with an associated cam 960 which is secured to the previously mentioned driven shaft 168.

Pivotally mounted on the shaft 662 adjacent the member 952 is a 2 armed lever 961. The lever 961 is tensioned counterclockwise in Fig. 7 by a spring 962 connected from the one arm thereof to a fixed spring stud 965, so as to maintain a roller carried on the other arm continuously engaged with an eccentric cam 966, the latter being secured to the previously mentioned driven shaft 168. Rotatably supported by the one arm of lever 961 is a shaft 968 to which is secured a pawl-like member 970. A spring 971 connected from the pawl 970 to a fixed stud tensions the pawl and associated supporting shaft 968 counterclockwise in Fig. 7 relative to the lever 961, so as to maintain a nose 972 of the pawl engaged with an arcuate cam surface 973 of the third arm of lever 952. The shaft 968 extends through a slot in the left frame member 114 and beyond the member 114 as shown in Fig. 21. A pawl 975 identical to the pawl 970, is secured to this extending portion of the shaft in a position aligned with a ratchet 976, the ratchet being secured to the shaft 938. The pawls 970 and 975 associated with shaft 968 are secured thereto in the same angular position. With the lever 352 latched as shown in Fig. 7, the nose of the pawl 975 is clear of the teeth of the ratchet 976 (see Fig. 12).

The contour of the cam 966 is such that the lever 961 is rocked back and forth on the shaft 662 through an angular increment of sufficient magnitude to effect a related indexing movement of the pawl 975 through a distance equal to one tooth of the ratchet 976. A similar motion of the pawl 970 back and forth on the cam surface 973 of the third arm of lever 952 is also effected for each back and forth rocking of lever 961. The indexing motion of the pawl 975 is, of course, ineffective for effecting an advance of the ratchet 976 and shaft 938 as long as the lever 952 is latched.

To initiate a line space operation, the magnet 953 is impulsed in any appropriate manner. The resultant attraction of the associated armature unlatches the lever 952 which then rotates clockwise from the position shown in Fig. 7 until the roller 957 thereof engages the cam 960. As the lever 952 rocks clockwise, the associated motion of the integral cam surface 973 permits the pawl 970 and associated shaft 968 to rock counterclockwise relative to the lever 961, so that the nose of the pawl 975 drops into position behind an adjacent tooth of the ratchet 976. The subsequent clockwise motion of the lever 961 on shaft 662 is accordingly effective through pawl 975 to advance the ratchet 976 and associated shaft 938 through the associated sprockets 940 etc. to effect an advance of the print record 599 one print line.

After the advance of the print record 599, the cam 966 rocks the lever 952 clockwise, this action being effective through integral cam surface 973 to disengage the pawl 975 from the ratchet 976, and also relatch the lever 952 on the restored armature of the now unenergized control magnet 953. The mechanism is then in condition for the next print record advance operation. A spring pressed detent 977 pivotally mounted on the outer surface of the frame 114, engages the ratchet 976, as indicated in Fig. 6, to prevent any motion of the ratchet 976 in a counterclockwise direction in Fig. 7. It will be appreciated that by impulsing the control magnet 953 once or a number of times, the record 599 is advanced, correspondingly, one or more lines, as required. Circuit means which can be controlled through plugboard wiring on the control panel 127, are provided for applying 1, 2 or 4 impulses to the magnet 953 at the beginning of each print line cycle so as to effect 1, 2 or 4 line spaces of the print record 599 as desired.

*The forms skip control device*

The line space control magnet 953 of the print record advancing or line space mechanism, previously described, may be repeatedly impulsed to rapidly advance or skip the print record over portions thereof wherein no printing is required. This repeated impulsing of the control magnet 953 is effected through circuitry jointly controlled by suitable plugboard wiring of the control panel 127 and a so-called forms skip control device 988 (see Figs. 5 and 6) of the paper tape controlled type.

Referring now to Fig. 6, the forms skip control device 988 comprises a cylindrical member 990 rigidly mounted on a portion of the shaft 938 which extends outward beyond the associated driving ratchet 976 thereof. The cylinder 990 has spaced teeth 991 cut in the periphery thereof, the teeth 991 extending lengthwise on the cylinder as indicated in Fig. 48. The angular spacing between the teeth of member 991 and the teeth of ratchet 976 is identical so that a single tooth advance of member 990 is effected for each single tooth advance of the ratchet 976, and the resultant single line advance of the record strip 599.

The device 988 includes a paper controlling tape 992 which is formed into an endless loop, the peripheral length of the tape being predetermined to exactly correspond to the length of one or more of the individual records of the continuous print form 599. The one end of the loop is supported on the member 990 while the other end of the loop is engaged by a free cylinder (not shown), the weight of the cylinder being sufficient to maintain the paper loop taut. The cylinder 990 carries a band of fixed pins 995 around its mid-portion which are adapted to engaged mating openings 996 in the tape loop so that as the member 999 rotates, the tape 992 is driven thereby.

Adapted for cooperation with the paper tape 992 and member 990, in a manner to be explained, is a switch mechanism which is generally designated 997 in Figs. 5 and 6. The mechanism 997 includes a supporting frame which is comprised of a pair of bracket-like members 998 and 1000 rigidly fastened together. Four identical switch units 1001, 1002, 1003 and 1004 are rigidly secured to the bracket 1000 in a side by side relationship as shown in Fig. 6.

Each switch is comprised of flexible parallel contact members 1006 and 1007 (Fig. 12), the one end of each contact member being freely flexible and having an integral contact area 1008, while the other end thereof is rigidly supported in a sandwichlike supporting structure comprised of various insulating spacers 1009, the members 1006 and 1007, and a conductive terminal member 1011, each contact member being connected to the one side of a circuit to be switched. Screws 1012 extending through each sandwich structure to the bracket 1000 secure the related switch to the bracket. An insulating bushing surrounds each screw along its length where it extends through the related sandwich structure to prevent accidental shorting of the contact members 1006 and 1007 to each other, or to the bracket 1000.

The contact member 1006 of each switch 1001, etc. is engaged by a related actuating finger 1013 which is formed of an insulating material and is secured to the one end of an associated lever 1014. Each lever 1014 is pivotally supported at its other end and accurately maintained aligned with its related contact member 1006 by a comb-like support 1016, the latter being secured to the bracket 998. A star shaped wheel 1017 is rotatably mounted on each lever 1014 in a position such that each tooth of the wheel, if the wheel is rotated, extends in turn beyond the edge of the lever 1014. The dimensions of each star wheel 1017 are such that the distance between successive teeth thereof is equal to the distance between teeth 991 of the member 990.

Extending above and parallel to the member 990 is a shaft 1018 which is rigidly supported at one end by the left frame 114. The switch mechanism is pivotally supported above the member 990 by the engagement of shaft 1018 with suitable aligned openings in the left and right side portions of the bracket 998. A spacer 1018 (see Fig. 5) carried on shaft 1018 between the frame 114 and right end portion of bracket 998, and a collar 1021 secured to the shaft 1018 near its outer end, accurately position the switch mechanism 988 on the shaft so that each star wheel 1017 is aligned with a related possible track of perforations on the paper tape 992.

A spring 1022 surrounding the shaft 1018 and rigidly fastened at one end to a collar 1021 secured to the shaft with the other end engaging the bracket 998, continuously biases the switch mechanism 988 counterclockwise on the shaft 1018 towards a so-called inoperative position as shown in Fig. 12. It will be noted that counterclockwise motion of the switch mechanism beyond the position indicated in Fig. 12 is prevented by the engagement of bracket 998 with a portion of the shaft 117 which extends beyond the left frame 114.

When desired, the machine operator manually displaces the switch mechanism 988 clockwise on shaft 1018, from the inoperative position shown in Fig. 12 and against the tension of associated spring 1022 to an operative position as shown in Figs. 5 and 6. The mechanism is accurately aligned in its operative position by the engagement of an extending portion 1024 of bracket 998 with an abutment rigidly supported by the left frame 114.

The switch mechanism 988 is locked in its operating position against the action of related spring 1022 by a suitable latch mechanism. The latch mechanism comprises a latch hook 1027 (Fig. 12) which is secured to the one end of a shaft 1028, the latter being pivotally supported by the side portions of the bracket 1000. Also secured to the shaft 1028 is a manual actuating member 1029 (Figs. 5 and 6) which has a finger grip 1029A extending laterally therefrom and into the plane of the side portion of the bracket 1000. A tensioning spring connected between the member 1029 and the bracket 1000 urges the shaft 1028 clockwise in Fig. 12 so as to normally maintain the grip 1029A engaging the bracket 1000.

As the switch mechanism 988 is being rocked from its non-operative into its operative position, the operator through finger grip 1029A rocks the shaft 1028 counterclockwise so that the associated hooked latch will clear a latch pin 1032 rigidly secured to the left frame 114. After the switch mechanism is in its operative position, the operator releases the grip 1029A. The resultant restoration motion of shaft 1028 engages the associated latch 1027 with the pin 1032 as indicated in phantom in Fig. 12 to lock the mechanism in the operative position.

With the switch mechanism in its operative position each of the four star wheels 1017 engages its related track on the paper tape 992 as indicated in Fig. 6. Each track of the tape is perforated representative of the type of skip operation to be controlled thereby. If the area of a track of the loop engaged by the associated wheel 1017 is not perforated, the position of the related lever 1014 is such that the corresponding contact member 1006 is flexed upward in Fig. 12 into engagement with the mating contact member 1007 to close that switch. If on a subsequent line space operation, a perforated area of the related track of tape 992 advances under the star wheel 1017, the associated lever 1014 rocks clockwise under the tension of the flexed contact member 1006, so that the tooth of the wheel 1017 extends through the perforation and into the space between the adjacent pair of teeth of the member 990. The lever 1014 rocks clockwise a sufficient amount so that the contact member 1006 moves free of engagement with the mating member 1007 to open that switch.

When desired, the line space control magnet 953 may be linked under plugboard control and through circuitry associated with any predetermined one of switches 1001, etc., to a source of impulses so as to effect repeated line space operations or so-called skipping of the record 599. Once this type of operation is initiated it continues as long as the related switch 1001, etc. remains open. This switch remains open, of course, until a perforated area in the related track of the paper tape 992 is advanced into engagement with the related star wheel 1017. It is thus evident that by perforating each track of the tape at predetermined points and by properly inserting the loop on the member 990 so that when a predetermined line of an individual record of the continuous sheet 599 is in the print position, a corresponding point of the 4 tracks of the loop of paper tape 992 is engaged by the related star wheel 1017, the sheet 599 can be skipped from any print line or lines of one of the individual records thereof to any one of predetermined succeeding lines of that same individual record; or from any print line or lines of one of the individual records of the sheet 599 to a desired print line of the succeeding record. A forms skip operation is usually initiated after the printing operation is completed in the last desired column of a particular print line. The position of the print position emitter following the last desired print column of a line may, accordingly, be utilized as the initiating source of not only the line stop operation, as described above, but also as the initiating source of any desired forms skip operation.

It is believed that the actual details of the timing relationship for applying the coded signals to the print device to effect character printing action in desired columns, including impulses to the hammer mechanism, and also the timed pulse relationship required for line operation, forms skip etc., is obvious to persons versed in this art and is not required for an understanding of the actual printing operation. The details of the timing relationship may be found, for example, in copending application, Serial No. 555,026, filed December 23, 1955, of which the instant application is a division.

It will also be appreciated that the source of the coded character print control signals and other control signals need not come from a storage drum, as mentioned above and also need not be timed by the combined print position emitter 363 and drum address signals source interaction, but may, for example, be responsive to properly coded and timed character and control signals applied over telegraph lines and the like in the well known type of telegraph printer operation.

While there have been shown and described and pointed out the fundamental novel features of the invention as applied to a preferred embodiment, it will be understood that various omissions and substitutions and changes in the form and details of the device illustrated and its operation may be made by those skilled in the art, without departing from the spirit of the invention. It is the intention, therefore, to be limited only as indicated by the scope of the following claims.

What is claimed is:

1. In combination, a type head having a face on which a plurality of print characters are arranged in spaced relationship, a print hammer engageable with said type head, means for moving said type head and hammer simultaneously to successive columnar printing positions, means biasing said type head toward a home position relative to said print hammer, means for moving said type head relative to said hammer against said biasing means to locate any one of said print characters in print position, comprising a wire connected to the type head at one end, a plurality of print character selection pulleys and an anchor mounted on stationary supporting structure, said wire extending from the type head and looped partly around each pulley to said anchor, compensating means also engaged with said wire to continuously compensate for the movement of said type element to successive columnar print positions relative to said selection pulleys supported on stationary structure, and means for selectively changing the positions of said pulleys and said anchor on said stationary supporting structure to move the type head an amount corresponding to the extent of movement of the pulleys and anchor.

2. In combination, a type head having a face on which a plurality of print characters are arranged in spaced relationship, a print hammer engageable with said type head, means for moving said type head and hammer simultaneously to successive columnar printing positions, means biasing said type head so as to normally position a particular area of said face adjacent said print hammer, cable means linked to said type head, type character selection apparatus mounted on stationary structure for acting through said cable means to impart type character selection motion to said type head against said biasing means, and yieldable compensating means acting on said cable means to maintain said cable means taut to render said selection motion equally effective regardless of the columnar position of said type head relative to said selection apparatus.

3. In combination, a type head having a face on which a plurality of print characters are arranged in spaced relationship, a print hammer engageable with said type head, means for advancing said type head and hammer simultaneously to successive columnar printing positions, means biasing said type head towards a home position relative to said print hammer, a wire connected to the type head at one end, a plurality of print character selection pulleys mounted on stationary supporting structure, an anchor, said wire extending in a path from the type head and looped partly around each pulley to said anchor; compensating means comprising a member adapted for movement in a path parallel to the type head and print hammer columnar advance path, said member carrying a pulley engaged by a loop of said wire in said path from said type head to said selection pulleys, means for advancing said compensating carriage simultaneously with said type head and print hammer columnar advancement and at ½ the speed of said advancement, and means for selectively varying the positions of said selection pulleys on said stationary structure towards or away from each other to move the type head an amount corresponding to the extent of movement of the pulleys.

4. In combination, a type head having a face on which a plurality of print characters are arranged in spaced relationship, a print hammer engageable with said type head, means for advancing said type head and hammer simultaneously in parallel paths to successive columnar print positions of a line of a print record, an anchor, a wire connected between said type head and said anchor, said head being spring biased against the wire to hold it taut, a type character selection guide cooperating with a portion of said wire and normally positioned to hold said cooperating portion in a path of predetermined configuration to position a predetermined one of said print characters in print position, a compensating guide engaging said wire at a point between said type head and said selection guide, said compensating guide engaging said wire to form a loop having two arms parallel to the advancement path of said type head and hammer, means for concurrently advancing said guide in a path parallel to and at ½ the speed of said type head and hammer advancement, whereby the one arm of said loop is lengthened and the other proportionally shortened with the total loop length remaining constant regardless of the print position of said type head and hammer, and means for selectively changing the positions of said selection guide and anchor to alter the path of the wire and move the type head to a selected one of its other positions.

5. In combination, a prismatic type head having a number of print characters arranged on its faces in columns and rows, a print hammer engageable with said type head, means for supporting a print record in stationary printing position, means for moving said type head and hammer simultaneously to successive columnar printing positions of said record, a first operating wire connected to said head, means for drawing said wire to move the head for presentation of an element in a predetermined row, a second operating wire connected to said head, means for drawing said second wire to move the head for presentation of an element in a predetermined column, means for rendering both said drawing means concurrently effective to present the type character related to said predetermined column and row to said print hammer as the type head reaches each desired columnar print position, said drawing means comprising an anchor to which the wire is connected, a number of selection pulleys bearing against the wire at points intermediate the type head and anchor, and power operated means for causing said pulleys, singly or in combination, to move against said wire a predetermined individual coded extent for each pulley, said pulleys and anchors being supported in structure that is stationary relative to said type head and print hammer column advancement motion; and compensating means acting on said wire to render said drawing means equally effective regardless of the columnar print position of said type head and hammer, said compensating means comprising means including a pair of compensating pulleys each engaged by a related one of said wires at a point between said type head and said related selection pulleys, each compensating pulley engaging the related wire to form a loop therein having two arms parallel to the columnar advancement path of said type head and hammer, and means for concurrently advancing said compensating pulleys in a path parallel to and at ½ the speed of said type head and hammer advancement.

6. Printing apparatus comprising, in combination, a type body having a plurality of characters to be printed, a carriage for supporting said type body, said type body being displaceable on said carriage within predetermined limits to align any desired one of said characters in a print position, the displacing of said type body taking place against the action of a tensioning means acting between said type body and carriage, means reciprocally supporting said type carriage so that it may be moved from a home position in a path to present said type body to successive columnar print positions of a print line of a stationary print record and then restored to said home position, a hammer mechanism for forcing a print record against a character of said type body when in print position, means reciprocally supporting said hammer mechanism so that it may be advanced and restored in a path aligned with said type element carriage, a compensating carriage having a pulley mounted thereon, means reciprocally supporting said compensating carriage so that it may be reciprocated in a path parallel to the paths of said type body and hammer, drive means for advancing said type body carriage and hammer at an identical uniform rate to position said type body and hammer mechanism to successive print columns of a print line of said print record and to then restore them in unison at the completion of the print line, means for advancing and restoring said compensating carriage in unison with but at ½ the rate of said type body and hammer, a set-up cable attached to said type body for applying a type character selection action to said type body against said tensioning means as the type carriage advances to each desired columnar print position, set-up mechanism carried on stationary structure and operable to displace said cable longitudinally to apply type character selection motion to said type body, said cable engaging said compensating carriage pulley to form a 180° loop reversal of the path of said cable in its path between said type body and set-up mechanism, and means for operating said type character selection mechanism.

7. Printing apparatus comprising, in combination, means for maintaining a print record in a print position, an inked ribbon supported adjacent said print record, a print element carriage, a hammer carriage, and a compensating carriage, all mounted for reciprocation in parallel paths relative to said record, said print element carriage carrying a type body having a plurality of characters to be printed and displaceable on said carriage within predetermined limits to align any desired one of said characters in a print position, said hammer carriage including a hammer mechanism to bring together the paper and ribbon and a desired character of said type body to effect a print operation at successive columnar positions of said print record, said compensating carriage including a pulley rotatably supported thereon, driving mechanism for moving said carriages in said reciprocation paths, said driving mechanism moving said carriages in unison with the print element carriage and hammer carriage being aligned and moving at the same speed while said compensating carriage is displaced at one half the speed of the other carriages, a cable attached to said type body for applying a type character selection action to said type body as the type carriage advances to each desired columnar print position of said record, and set-up mechanism carried on stationary structure and displacing said cable longitudinally to apply type character selection motion to said type body, said cable engaging said compensating carriage pulley to form a 180° reversal loop in the path of said cable between said type body and said set-up mechanism.

8. Printing apparatus comprising, in combination, a type body having a plurality of print characters arranged thereon, means for maintaining a print record in a print position, an inked ribbon supported adjacent said record, a hammer mechanism to bring together the paper, ribbon, and a desired character of the type body to effect a print operation, a first reciprocally mounted carriage means supporting said type body and hammer mechanism for moving said hammer and type body from a home columnar position past successive columnar print positions of a print line of said record to effect printing therein, and to restore said hammer and type body to the home columnar position after the completion of a print line, said type body being movable on said carriage means to position a desired print character thereof in a print position as each print column is approached, second carriage means reciprocable in a path parallel to said first carriage means, said second carriage rotatably supporting a number of pulleys thereon, means for reciprocating said carriages including, a cable take-up mechanism, a cable having an operational connection at one end to said first carriage means and connected at the other end to said cable take-up mechanism, a second cable having one end secured to said first carriage means and another end secured to a fixed anchor, said second cable engaging one of said second carriage means pulleys to form a 180° direction reversal in the path of said second cable between said first carriage means and said anchor, extendable tensioning means having an end secured to stationary structure and an end secured to said second carriage means to bias it towards a home position, said biasing action on said second carriage means being effective through the operational linkage of said second cable to also bias said first carriage means towards the home columnar position, means for driving said cable take-up mechanism to sweep said first carriage means past successive columns of said print record and in turn displace said second carriage means, said first and second carriage means being displaced against the action of said tensioning means with the second carriage moving at ½ the speed of said first carriage means by reason of said 180° loop reversal; a set-up cable operatively linked to said type body for applying a type character selection action to said type body as said first carriage means advances to columnar print positions, and set-up mechanism carried on stationary structure for shifting said set-up cable longitudinally to apply varying amounts of type character selection motion to said type body, said cable engaging another pulley of said second carriage to form a 180° reversal loop in the path of said set-up cable between said type body and said set-up mechanism.

9. Printing apparatus comprising, in combination, first, second, and third carriages mounted for reciprocation in parallel paths, a type body having a plurality of possible type characters thereon and mounted on said first carriage for relative motion thereon to position a desired one of said type characters in a print position, means supporting a print record adjacent the path of said first carriage so that said type body is presented to successive columnar print positions of a line of said record by a movement of said first carriage, an inked ribbon supported adjacent said print record, a hammer mechanism carried on said second carriage and operating to force said print record and inked ribbon against the selected type character at each desired columnar print position to effect printing means for sweeping said first and second carriages in alignment from a home columnar print position past successive columnar print positions, and for simultaneous advancing said third carriage at ½ the rate of said first and second carriages, said third carriage including a pulley rotatably mounted thereon, and means for imparting a desired set-up motion to said type body to position the desired type character in print position as each desired columnar print position is approached, said set-up means comprising set-up mechanism mounted on stationary structure and adapted to longitudinally shift a set-up cable varying amounts, one end of said cable being connected to said type body to apply type character selection motion thereto, the cable extending from said set-up mechanism and forming a 180° path reversal loop over said pulley of said third carriage in the path of the cable between said type body and said set-up mechanism.

10. Printing apparatus comprising, in combination, first, second, and third carriages mounted for reciprocation in parallel paths, a type body having a plurality of possible type characters thereon in a matrix pattern, said type body being mounted on said first carriage for relative motion in first and second distinct directions to position any desired one of said characters in said matrix pattern at a print position, means supporting a print record adjacent the path of said first carriage so that said type body is presented to successive columnar print positions of a line of said record by a movement of said first carriage, an inked ribbon supported adjacent said print record, a hammer mechanism carried on said second carriage and operating to force said print record and inked ribbon against the selected type character at each desired columnar print position to effect printing, means for sweeping said first and second carriages in alignment from a home columnar print position past successive columnar print positions, and for simultaneously advancing said third carriage at ½ the rate of said first and second carriages, said third carriage including a plurality of pulleys rotatably supported thereon, first set-up mechanism for imparting the first direction motion to said type body, and second set-up mechanism for imparting the second direction motion to said type body, each said set-up mechanism comprising set-up mechanism mounted on stationary structure and adapted to longitudinally shift a related set-up cable varying amounts, one end of said cable being connected to said type body to apply the related direction type character selection motion thereto, each set-up cable in its path extending from said related set-up mechanism to said type body engaging a related distinct one of said third carriage pulleys to form a loop having two parallel arms parallel to the path of said carriages, with the one arm of said loop being lengthened and the other arm proportionally shortened so that the loop length remains constant regardless of the positions of said carriages.

11. Printing apparatus as in claim 10 further characterized by the fact that said first and second set-up mechanisms operate simultaneously to apply the related set-up motion to said type body.

12. Printing apparatus as in claim 10 further characterized by the fact that said type body is cylindrical in shape with the type characters being arranged thereon in a number of lines about the surface thereof, the first of said set-up motions being effective to displace the cylinder axially, and the second of said set-up motions being effective to displace the cylinder angularly, said set-up mechanisms operating simultaneously to apply the axial-angular set-up motion to said type body.

References Cited in the file of this patent

UNITED STATES PATENTS

| | | |
|---|---|---|
| 2,727,944 | Howard | Dec. 20, 1955 |
| 2,757,775 | Hickerson | Aug. 7, 1956 |
| 2,769,029 | Howard | Oct. 30, 1956 |